(12) United States Patent
Yamashita et al.

(10) Patent No.: US 12,502,711 B2
(45) Date of Patent: Dec. 23, 2025

(54) LAMINATION FABRICATING METHOD

(71) Applicants: Yasuyuki Yamashita, Kanagawa (JP); Hisataka Takagi, Telford England (GB)

(72) Inventors: Yasuyuki Yamashita, Kanagawa (JP); Hisataka Takagi, Telford England (GB)

(73) Assignee: Ricoh Company, Ltd., Tokyo (JP)

( * ) Notice: Subject to any disclaimer, the term of this patent is extended or adjusted under 35 U.S.C. 154(b) by 385 days.

(21) Appl. No.: 18/177,991

(22) Filed: Mar. 3, 2023

(65) Prior Publication Data

US 2023/0278102 A1    Sep. 7, 2023

(30) Foreign Application Priority Data

Mar. 4, 2022  (JP) .................. 2022-033646
Nov. 25, 2022 (JP) .................. 2022-188111

(51) Int. Cl.
| | |
|---|---|
| B22F 10/14 | (2021.01) |
| B22F 10/30 | (2021.01) |
| B29C 64/165 | (2017.01) |
| B29C 64/393 | (2017.01) |
| B33Y 10/00 | (2015.01) |
| B33Y 50/02 | (2015.01) |

(52) U.S. Cl.
CPC .............. *B22F 10/14* (2021.01); *B22F 10/30* (2021.01); *B29C 64/165* (2017.08); *B29C 64/393* (2017.08); *B33Y 10/00* (2014.12); *B33Y 50/02* (2014.12)

(58) Field of Classification Search
CPC .......... B22F 10/14; B22F 10/30; B22F 10/37; B22F 10/40; B22F 12/63; B29C 64/165; B29C 64/393; B29C 64/218; B29C 64/40; B33Y 10/00; B33Y 50/02; Y02P 10/25
See application file for complete search history.

(56) References Cited

U.S. PATENT DOCUMENTS

| | | |
|---|---|---|
| 2016/0177122 A1 | 6/2016 | Naruse et al. |
| 2016/0236412 A1 | 8/2016 | Kusahara et al. |
| 2016/0271877 A1 | 9/2016 | Suzuki et al. |
| 2016/0271879 A1 | 9/2016 | Yamashita et al. |

(Continued)

FOREIGN PATENT DOCUMENTS

| | | |
|---|---|---|
| JP | 2013-136169 | 7/2013 |
| JP | 2015-066872 | 4/2015 |

(Continued)

OTHER PUBLICATIONS

U.S. Appl. No. 18/149,368, filed Jan. 3, 2023, Koji Takimoto, et al.

(Continued)

*Primary Examiner* — Ricardo D Morales
(74) *Attorney, Agent, or Firm* — IPUSA, PLLC

(57) ABSTRACT

A lamination fabricating method includes forming a powder layer including a powder for three-dimensional fabrication, applying a fabrication liquid to the powder layer, repeating the forming of the powder layer and the forming the powder layer to form a fabricated object, and forming a base layer prior to the forming of the powder layer. A powder filling rate of the base layer is higher than a powder filling rate of the powder layer.

5 Claims, 9 Drawing Sheets

(56) References Cited

U.S. PATENT DOCUMENTS

| | | |
|---|---|---|
| 2016/0272817 A1 | 9/2016 | Naruse et al. |
| 2017/0266880 A1 | 9/2017 | Matsubara |
| 2018/0022024 A1 | 1/2018 | Saito et al. |
| 2018/0023219 A1 | 1/2018 | Saito et al. |
| 2018/0264721 A1 | 9/2018 | Sohichiroh et al. |
| 2019/0126538 A1 | 5/2019 | Fujita et al. |
| 2019/0134853 A1 | 5/2019 | Iwatsuki et al. |
| 2019/0184461 A1 | 6/2019 | Okamoto et al. |
| 2019/0241734 A1 | 8/2019 | Naruse et al. |
| 2019/0284351 A1 | 9/2019 | Yaguchi et al. |
| 2020/0016827 A1 | 1/2020 | Yamashita et al. |
| 2020/0362142 A1 | 11/2020 | Saito et al. |
| 2020/0391293 A1 | 12/2020 | Sheinman et al. |
| 2021/0039311 A1 | 2/2021 | Kusahara et al. |
| 2021/0299953 A1 | 9/2021 | Nagatomo et al. |
| 2021/0317601 A1 | 10/2021 | Saito et al. |
| 2022/0001450 A1 | 1/2022 | Osanai |
| 2022/0032377 A1* | 2/2022 | Hudelson ............... B22F 10/50 |
| 2022/0032379 A1 | 2/2022 | Yamashita et al. |
| 2022/0388069 A1 | 12/2022 | Kai et al. |
| 2022/0402040 A1 | 12/2022 | Yamashita et al. |

FOREIGN PATENT DOCUMENTS

| | | |
|---|---|---|
| JP | 2017-164989 | 9/2017 |
| JP | 2018-154116 | 10/2018 |
| WO | 2020/102025 | 5/2020 |
| WO | 2022/011164 | 1/2022 |

OTHER PUBLICATIONS

U.S. Appl. No. 18/048,133, filed Oct. 20, 2022, Hisataka Takagi, et al.

Extended European Search Report for 23159811.1 mailed on Jun. 6, 2023.

\* cited by examiner

LAMINATION FABRICATING METHOD

CROSS-REFERENCE TO RELATED APPLICATIONS

This patent application is based on and claims priority pursuant to 35 U.S.C. § 119(a) to Japanese Patent Application Nos. 2022-033646, filed on Mar. 4, 2022, and 2022-188111, filed on Nov. 25, 2022, in the Japan Patent Office, the entire disclosure of each of which is hereby incorporated by reference herein.

BACKGROUND

Technical Field

Embodiments of the present disclosure relate to a lamination fabricating method.

Related Art

For a solid fabricating apparatus (three-dimensional fabricating apparatus) that fabricates a three-dimensional object (three-dimensional fabricated object), for example, an additive manufacturing method or lamination molding method is known that fabricates a three-dimensional object by repeating a step of forming a powder layer obtained by laminating fabrication powder and a fabrication layer obtained by applying fabrication liquid to the powder layer.

For example, an apparatus for fabricating a three-dimensional object has been proposed that includes a flattening unit, a fabrication liquid application unit, and a unit for detecting a temperature, and performs control by changing a movement speed and a rotation speed of the flattening unit in accordance with the detected temperature.

SUMMARY

According to an embodiment of the present disclosure, a lamination fabricating method includes forming a powder layer including a powder for three-dimensional fabrication, applying a fabrication liquid to the powder layer, repeating the forming of the powder layer and the forming the powder layer to form a fabricated object, and forming a base layer prior to the forming of the powder layer. A powder filling rate of the base layer is higher than a powder filling rate of the powder layer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
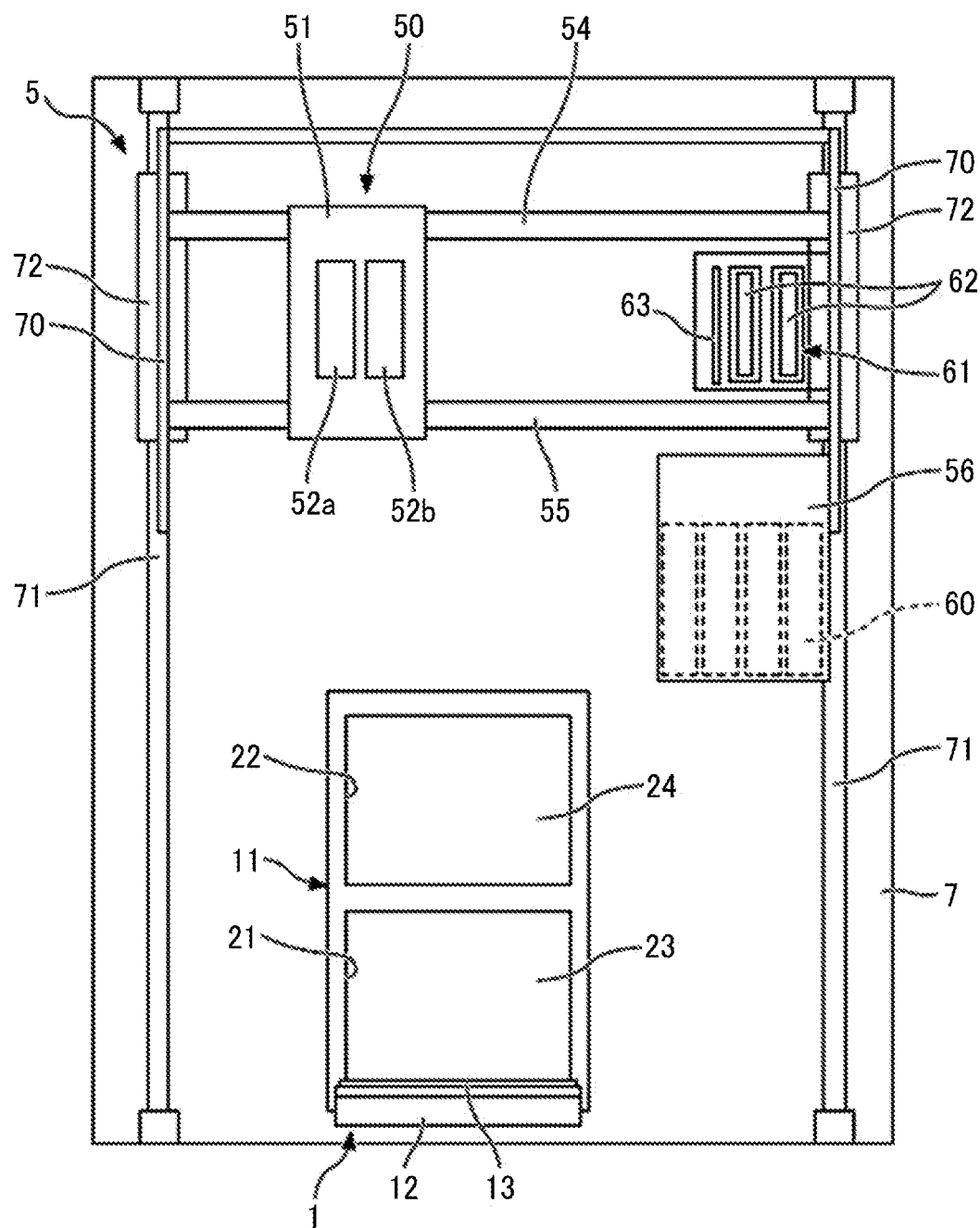
FIG. 1 is a schematic plan view of a lamination fabricating apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise.

Lamination Fabricating Method and Lamination Fabricating Apparatus

A lamination fabricating method according to an embodiment of the present disclosure includes a base layer forming step, a powder layer forming step, an application step, and may further include other steps if desired.

A lamination fabricating apparatus according to an embodiment of the present disclosure includes a powder for three-dimensional fabrication, a fabrication liquid, a base layer forming unit, a powder layer forming unit, and an application unit, and may include other components if desired.

A lamination fabricating method according to an embodiment of the present disclosure can be suitably executed by a lamination fabricating apparatus.

As used herein, the term "powder layer" obtained by the powder layer forming step and the term "fabrication layer" obtained by the application step each refer to a single layer obtained by the corresponding step.

The term "fabricated object" used herein refers to a laminated object obtained by laminating fabrication layers. In other words, the term "fabricated object" used herein refers to a laminated object of fabrication layers obtained by repeatedly performing the powder layer forming step and the application step.

Other components and steps to be included are not particularly limited, may be appropriately selected according to a purpose, and an example thereof is a removal unit or a removal step.

In conventional methods of fabricating a three-dimensional fabricated object, a method of preparing a base layer and physical properties of the base layer are not defined.

In the formation of a base layer, if the base layer is formed by the same method as the method of forming a powder layer, on other words, if the distance between a forming unit such as a recoater and a fabrication stage is set to be about the same as the distance at the time of forming the powder layer, the powder used for forming the base layer may not be sufficiently distributed. Typically, the forming unit and the fabrication stage are formed of hard members. Accordingly, if the distance between the forming unit and the fabrication stage is too small, powder may not pass through a clearance between the forming unit and the fabrication stage, and a sufficient base layer may not be formed. In such a case, the height of the fabrication stage is lowered in the related art. However, there is a disadvantage in that the powder filling rate of the base layer is lower than the powder filling rate of the powder layer. This is because when the height of the fabrication stage is lowered to increase the distance between the forming unit and the fabrication stage, the base layer is not sufficiently compressed to form a fluffy layer. When the powder filling rate of the base layer is lower than the powder filling rate of the powder layer, the base layer is compressed as the powder layer is stacked on the base layer. Consequently, the height (thickness) of the fabricated object decreases, and the quality decreases. In this regard, a more specific description is given with reference to FIGS. 9A and 9B.

Figure 9A:
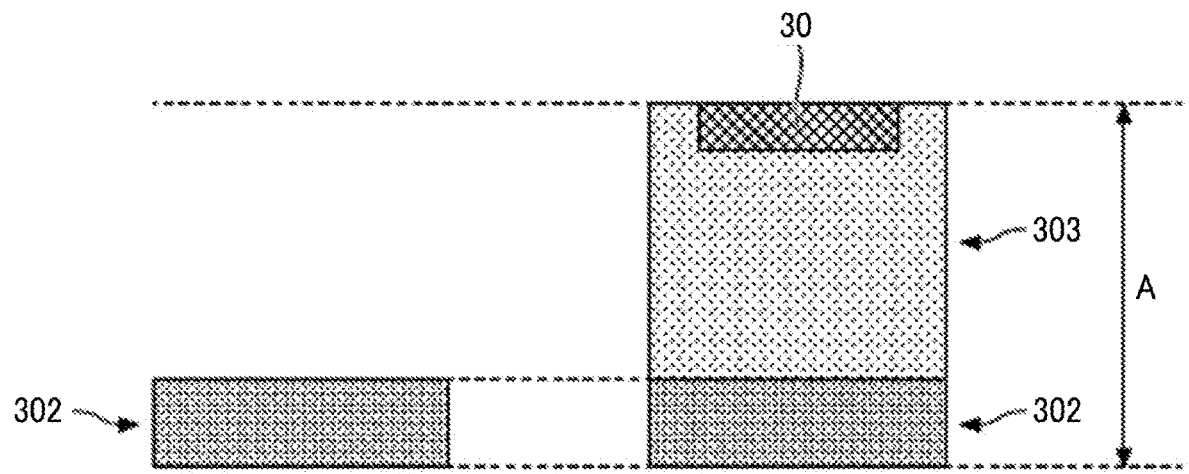
FIG. 9A is a diagram illustrating the height (thickness) of a fabricated object in a case where the powder filling rate of a base layer is higher than the powder filling rate of a powder layer.
Figure 9B:
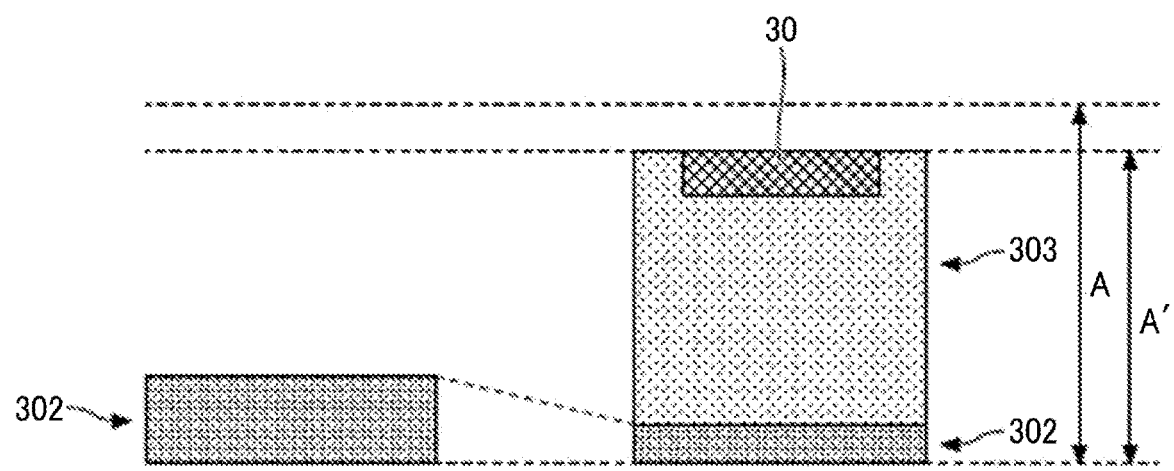
FIG. 9B is a diagram illustrating the height (thickness) of a fabricated object in a case where the powder filling rate of a base layer is lower than the powder filling rate of a powder layer.

FIG. 9A is a diagram illustrating the height (thickness) of a fabricated object in a case where the powder filling rate of a base layer is higher than the powder filling rate of a powder layer. FIG. 9A illustrates a base layer 302 before lamination of a powder layer 303 on the left side and the base layer 302 after lamination of the powder layer 303 on the right side. FIG. 9B is a diagram illustrating the height (thickness) of a fabricated object in a case where the powder filling rate of a base layer is lower than the powder filling rate of a powder layer. FIG. 9B illustrates a base layer 302 before lamination of a powder layer 303 on the left side and the base layer 302 after lamination of the powder layer 303 on the right side.

As illustrated in FIG. 9A, in a case where the powder filling rate of the base layer 302 is sufficiently high, the base layer 302 is not compressed by stacking of the powder layer 303 which may include the fabrication layer 30. Here, the height of the fabricated object when the base layer 302 is not compressed, in other words, the originally desired height of the fabricated object is indicated by "A".

On the other hand, as illustrated in FIG. 9B, in a case where the powder filling rate of the base layer 302 is lower than the powder filling rate of the powder layer 303, the base layer 302 is compressed as the powder layer 303, which may include a hardened object of fabrication layer 30, is laminated. Here, the height of the fabricated object when the base layer 302 is compressed is represented by "A'". In addition, although depending on the type and setting of the fabricating apparatus, the laminating step is additionally performed so that the height of the fabricated object be the desired height "A", in other words, so as to compensate for the decrease in the height of the fabricated object caused by the compression of the base layer 302 (the difference between A and A'). As a result, the thickness of the fabricated object may increase and the quality may decrease.

As a result of extensive studies, the inventors have found that, if the fabricated object is adjusted so that the powder filling rate of the base layer is higher than the powder filling rate of the powder layer, the compression of the base layer can be prevented and the quality of the fabricated object can also be maintained.

Therefore, according to an embodiment of the present disclosure, in a lamination fabricating method of forming a fabricated object by repeatedly performing forming a powder layer including a powder for three-dimensional fabrication, and applying a fabrication liquid to the powder layer, the lamination fabricating method includes forming a base layer prior to the forming of the powder layer, and a powder filling rate of the base layer is higher than a powder filling rate of the powder layer, so that a lamination fabricating method having excellent fabrication quality can be provided.

<Powder Layer Forming Step and Powder Layer Forming Unit>

A powder layer forming step in the present disclosure is a step of forming a powder layer containing a powder for three-dimensional fabrication.

A powder layer forming unit according to the present disclosure is a unit that forms the powder layer of the powder for three-dimensional fabrication. The powder layer forming step is suitably performed by the powder layer forming unit.

The powder layer forming unit is not particularly limited and can be appropriately selected according to a purpose. For example, a recoating member and a hopper may be preferably used as the powder layer forming unit. If the powder layer forming unit has a function of flattening the powder layer, the powder layer forming unit may also be referred to as a flattening unit.

<<Powder for Three-Dimensional Fabrication>>

The powder for three-dimensional fabrication in the present disclosure is not particularly limited and can be appropriately selected according to a purpose, but preferably contains a base material and a soluble organic material coating the base material.

In the powder for three-dimensional fabrication, the soluble organic material is dissolved by the action of a fabrication liquid containing a cross-linker, thus allowing the soluble organic material to be crosslinked. In other words, when the fabrication liquid is applied to the soluble organic material, the soluble organic material dissolves and is crosslinked by the action of the cross-linker contained in the fabrication liquid, and the powder layer is bonded and cured to form a fabrication layer.

—Base Material—

The base material is not particularly limited as long as the base material has the form of powder or particles, and can be appropriately selected according to a purpose. Examples of the base material include, but are not limited to, metals, ceramics, carbon, and polymers. Among these, from the viewpoint of obtaining a three-dimensional fabricated object having high strength, metals and ceramics that can be sintered in a final step are preferable, and metal particles are more preferable.

——Metal Particles——

The metal particles are particles containing a metal as a constituent material.

The constituent material of the metal particles is not particularly limited as long as the constituent material contains a metal, and the constituent material may contain materials other than the metal, but the main material is preferably a metal.

The expression "the main material is a metal" means that the mass of the metal contained in the metal particles is 50.0 mass % or more with respect to the total mass of the metal particles. The mass of the metal contained in the metal particles is preferably 60.0 mass % or more, more preferably 70.0 mass % or more, still more preferably 80.0 mass % or more, and particularly preferably 90.0 mass % or more, with respect to the total mass of the metal particles.

The metal is not particularly limited and can be appropriately selected according to a purpose. Examples of the metal include, but are not limited to, magnesium (Mg), aluminum (Al), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), lead (Pd), silver (Ag), indium (In), tin (Sn), tantalum (Ta), tungsten (W), neodymium (Nd), and alloys of these metals. Among these, stainless (SUS) steel, iron (Fe), copper (Cu), silver (Ag), titanium (Ti), aluminum (Al), and alloys of these metals are preferably used.

The stainless (SUS) steel is not particularly limited, may be appropriately selected according to a purpose, and an example thereof includes, but is not limited to, SUS316L.

Examples of the aluminum alloy include, but are not limited to, AlSi10Mg, AlSi12, AlSi7Mg0.6, AlSi3Mg, AlSi9Cu3, SCALMALLOY, ADC12, and AlSi3.

Each of these may be used alone or in combination with others.

The metal particles can be manufactured by using a conventionally known method. Examples of the method of manufacturing the metal particles include, but are not limited to, a pulverization method in which a solid is compressed, impacted, rubbed, or the like to obtain fine particles, an atomization method in which a molten metal is sprayed to obtain a quenched powder, a precipitation method in which a component dissolved in a liquid is precipitated, and a gas phase reaction method in which vaporization is performed to obtain a crystal. Among these, the atomization method is preferable because particles having a spherical shape can be obtained with little variation in particle diameter.

Examples of the atomization method include, but are not limited to, a water atomization method, a gas atomization method, a centrifugal atomization method, and a plasma atomization method, any of which is preferably used.

Commercially available metal particles may be used.

Examples of the commercially available metal particles include, but are not limited to, pure Al (A1070-30BB, manufactured by Toyo Aluminum K.K.), pure Ti (manufactured by OSAKA Titanium technologies Co., Ltd.), SUS316L (PSS316L, manufactured by Sanyo Special Steel Co., Ltd.), AlSi10Mg (Si10MgBB, manufactured by Toyo Aluminum K.K.), $SiO_2$ (EXCELICA SE-15K, manufactured by Tokuyama Corporation), $AlO_2$ (TAIMICRON™-5D, manufactured by Taimei Chemicals Co., Ltd.), and $ZrO_2$ (TZ-B53, manufactured by Tosoh Corporation).

A volume average particle diameter of the metal particles is not particularly limited and may be appropriately selected according to a purpose, but is preferably 2 μm or more and 100 μm or less, and more preferably 8 μm or more and 50 μm or less.

If the volume average particle diameter of the metal particles is 2 μm or more, the aggregation of the metal particles is suppressed, and thus, it is possible to suppress a decrease in the production efficiency of the fabricated object and a decrease in the handleability of the metal particles.

If an average particle diameter of the metal particles is 100 μm or less, a decrease in the number of contact points between the metal particles and an increase in voids therebetween can be suppressed, so that it is possible to suppress a decrease in the strength of the fabricated object.

The particle size distribution of the metal particles is not particularly limited and can be appropriately selected according to a purpose, but a sharper particle size distribution is preferable.

The volume average particle diameter and the particle size distribution of the metal particles can be measured by using a known particle diameter measuring device. An example of the particle diameter measuring device includes, but is not limited to, a particle diameter distribution measuring device, MICROTRAC MT3000II series (manufactured by MicrotracBEL).

Conventionally, there is known a method of manufacturing a fabricated object by using a metal base material and metal particles including a coating resin for coating the base material, and applying a liquid to the metal particles, so that the coating resin exhibits a binder function. However, in the present specification, the fabrication liquid may contain a resin having a binder function. Accordingly, a surface of the metal particles in the present specification may be coated with a resin or may not be coated with a resin. By using metal particles having a surface that is not coated with a resin, it is possible to prevent an unintended solidified product from being formed as a result of, for example, a coating resin binding the metal particles in a heating process even in a powder region where no liquid is applied (in other words, a non-fabrication region).

Here, the expression "a surface that is not coated with a resin" means that the ratio (surface coverage) of the surface area of the resin occupying in the surface area of the metal particle is less than 15%, and may be 0%.

A method of measuring the surface coverage is not particularly limited and can be appropriately selected according to a purpose. For example, the surface coverage can be determined by capturing an image of the metal particles, and measuring the ratio (%) of an area of a portion coated with the resin to the total surface area of the metal particles in a range captured in the two-dimensional image. In the determination of the portion coated with the resin, for example, an elemental mapping technique by energy-dispersive X-ray spectroscopy such as SEM-EDS can be used.

——Ceramics——

The ceramics to be used are not particularly limited and can be appropriately selected according to a purpose. Examples of the ceramics include, but are not limited to, metal oxides, and specifically, silica ($SiO_2$), alumina ($Al_2O_3$), zirconia ($ZrO_2$), and titania ($TiO_2$).

Each of these may be used alone or in combination with others.

——Carbon——

The forms of carbon to be used are not particularly limited and can be appropriately selected according to a purpose. Examples thereof include, but are not limited to, graphite, graphene, carbon nanotube, carbon nanohorn, and fullerene.

Each of these may be used alone or in combination with others.

The base material may be subjected to a known surface (modification) treatment for the purpose of enhancing the affinity with the soluble organic material.

—Soluble Organic Material—

The soluble organic material dissolves in the fabrication liquid and may be cross-linked by the action of a cross-linker. In other words, the soluble organic material is not particularly limited and can be appropriately selected according to a purpose as long as the soluble organic material is soluble in the fabrication liquid and is cross-linkable by a cross-linker. Examples of the soluble organic material include, but are not limited to, polyvinyl alcohol, polyacrylic acid, polyvinyl acetate, and copolymers thereof.

The coating amount of the soluble organic material coated on the base material is not particularly limited and can be appropriately selected according to a purpose, but the coating amount is preferably adjusted so that the average thickness is 5 nm or more and 500 nm or less. If the coating amount of the soluble organic material is within the above-mentioned range, when the soluble organic material dissolves in the fabrication liquid, a desired minimum amount of the soluble organic material is present in the vicinity of the base material and crosslinks to form a three-dimensional network. As a result, the powder layer is preferably hardened with high dimensional accuracy and high strength.

The soluble organic material may be coated on the base material and used, or may be mixed with the base material and used. The powder for three-dimensional fabrication may include a base material that does not contain a soluble organic material, and the soluble organic material may be contained in the fabrication liquid to form a fabricated object.

As the powder for three-dimensional fabrication, an appropriately synthesized powder may be used, or a commercially available powder may be used.

An example of the commercially available powder for three-dimensional fabrication includes, but is not limited to, A1070-30BB (manufactured by Toyo Aluminum Co., Ltd.).

The average thickness of one powder layer is not particularly limited and may be appropriately selected depending on the intended purpose. For example, the average thickness of one powder layer may be 0.03 mm or more and 0.2 mm or less. When the average thickness of one powder layer is 0.03 mm or more, the layer is thinner than the particle diameter of the powder for three-dimensional fabrication. Thus, the problem that a layer cannot be formed can be solved, which is preferable. When the average thickness of one powder layer is 0.2 mm or less, the resolving power of the fabricated object can be increased, which is preferable.

The average thickness of one powder layer may be measured by a known method, and may be obtained, for example, by measuring the distance between the powder layer forming unit and the upper surface of the base layer (or the fabrication layer) with a gap gauge. In the case of this measuring method, it is possible to measure the thickness at four points located 20 mm inside the four corners of the fabrication stage, and calculate an average as the average thickness.

The average distance between the powder layer forming unit and the upper surface of the base layer (or the fabrication layer) in the powder layer forming step is not particularly limited and may be appropriately selected depending on the intended purpose. For example, the average distance may be 0.03 mm or more and 0.2 mm or less.

<<Application Step and Application Unit>>

The application step in the present disclosure is a step of applying the fabrication liquid to the powder layer. In the application step, the fabrication liquid is selectively applied.

The application unit in the present disclosure is a unit that applies the fabrication liquid to the powder layer. The application unit selectively applies the fabrication liquid. The application step is suitably performed by the application unit.

The term "laminated surface of the powder layer" as used herein refers to a surface of the powder layer that does not contact the base layer.

The application unit is not particularly limited and can be appropriately selected according to a purpose. Examples thereof include, but are not limited to, a dispenser type, a spray type, and an inkjet type. Among these, the inkjet type is preferable. The dispenser type has excellent quantitative properties of droplets, but the application area is narrow. The spray type can easily form fine discharged droplets and has a large application area and excellent application properties. However, the spray type has poor quantitative properties of droplets, and the spray flow causes scattering of the fabrication liquid. The inkjet type is preferable in that the inkjet type has the advantages of better quantitative properties of droplets than the spray type and a larger application area than the dispenser type, and in that the inkjet type can form complex fabricated objects with high accuracy and efficiency.

In a case of using the application unit of the inkjet type, the application unit is an inkjet head including a nozzle that discharges a fabrication liquid. As the inkjet head, an inkjet head in a known inkjet printer can be suitably used. An example of the inkjet head in the inkjet printer includes, but is not limited to, RICOH MH/GH SERIES, an industrial inkjet manufactured by Ricoh Co., Ltd. An example of the inkjet printer includes, but is not limited to, SG7100 manufactured by Ricoh Co., Ltd.

<Fabrication Liquid>

The fabrication liquid is not particularly limited and can be appropriately selected according to a purpose. The fabrication liquid may contain, for example, a resin or an organic solvent, and may contain an additive such as a surfactant, and other components if desired. The fabrication liquid as used herein may be referred to as a "cross-linker-containing liquid".

<<Resin>>

The resin in the fabrication liquid is not particularly limited and can be appropriately selected according to a purpose, but preferably contains a resin including at least one structural unit selected from the group including a structural unit represented by Structural Formula (1) below and a structural unit represented by Structural Formula (2)

below. The term "structural unit" as used herein represents a partial structure in a resin derived from one or more polymerizable compounds.

[Chem. 1]

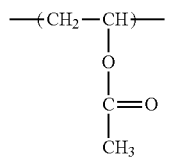

Structural Formula (1)

[Chem. 2]

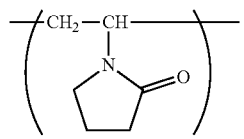

Structural Formula (2)

—Resin Including Structural Unit Represented by Structural Formula (1)—

The resin including the structural unit represented by Structural Formula (1) is arranged in the powder layer by applying the fabrication liquid to the powder layer containing the metal particles. Subsequently, the obtained product is subjected to an appropriate heating process in accordance with the softening point of the resin, so that the resin functions as a binder that binds the metal particles in a region where the fabrication liquid is applied. Thus, an unsintered fabricated object, such as a solidified product or a green body derived from a solidified product, is formed. Such an unsintered fabricated object is formed of the resin including the structural unit represented by Structural Formula (1) that provides flexibility, and thus, flexural strength increases.

The resin including the structural unit represented by Structural Formula (1) has excellent thermal decomposition properties, so that the resin is properly removed in a degreasing process. As a result, the density in a sintered body produced by the subsequent sintering process is improved. Therefore, if metal particles, which are a material that is assumed to be sintered or is preferably sintered, are used as the material (base material) for forming a fabricated object, the obtained effects are enhanced. Specifically, in the resin including the structural unit represented by Structural Formula (1), if the temperature is raised from 30° C. to 550° C., it is preferable that 95 mass % or more of the resin is thermally decomposed, and it is more preferable that 97 mass % or more of the resin is thermally decomposed.

The expression "the resin is thermally decomposed" as used herein means that random decomposition of the main chain or depolymerization at the molecular chain ends occurs, and accordingly, the resin is removed by vaporization, oxidative decomposition, combustion, or the like. The thermal decomposition properties can be measured by using a simultaneous thermogravimetry-differential thermal analyzer (TG-DTA). Specifically, the temperature is raised from 30° C. to 550° C. at a rate of 10° C./min in the air or in a nitrogen atmosphere, and after reaching 550° C., the temperature is maintained for 2 hours, and the ratio of the decrease in weight before and after the temperature rise is determined.

In the resin including the structural unit represented by Structural Formula (1), the structural unit represented by Structural Formula (1) is hydrophobic, and thus, the solubility of the resin in organic solvents is improved. Therefore, if the fabrication liquid contains an organic solvent, the solubility of the resin including the structural unit represented by Structural Formula (1) is improved, and accordingly, the viscosity of the fabrication liquid can be reduced, so that, for example, the fabrication liquid can be appropriately discharged by an inkjet technique. The resin including the structural unit represented by Structural Formula (1) is preferably soluble in the organic solvent of the fabrication liquid and insoluble in water.

The Tg of the resin including the structural unit represented by Structural Formula (1) is preferably 0° C. or higher, more preferably 10° C. or higher, and still more preferably 20° C. or higher. The Tg of the resin including the structural unit represented by Structural Formula (1) is preferably 100° C. or lower, more preferably 90° C. or lower, and still more preferably 80° C. or lower.

The softening point of the resin including the structural unit represented by Structural Formula (1) is preferably 70° C. or higher, more preferably 80° C. or higher, and still more preferably 90° C. or higher. The softening point of the resin including the structural unit represented by Structural Formula (1) is preferably 150° C. or lower, more preferably 140° C. or lower, and still more preferably 130° C. or lower.

The number average molecular weight (Mn) of the resin including the structural unit represented by Structural Formula (1) is preferably 5,000 or more and 50,000 or less, and more preferably 10,000 or more and 30,000 or less. If the number average molecular weight (Mn) of the resin including the structural unit represented by Structural Formula (1) is within the above-mentioned range, it is possible to achieve increased strength and fabrication accuracy as well as reduced viscosity of the fabrication liquid and increased resin concentration in the fabrication liquid.

The resin in the fabrication liquid may have a structural unit represented by a structure other than Structural Formula (1). Examples of the structural unit represented by a structural formula other than Structural Formula (1) preferably include a structural unit represented by Structural Formula (3) below and a structural unit represented by Structural Formula (4) below.

[Chem. 3]

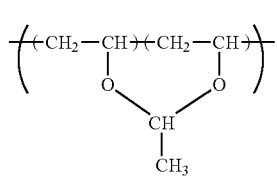

Structural Formula (3)

[Chem. 4]

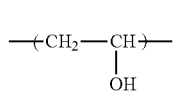

Structural Formula (4)

The resin including the structural unit represented by Structural Formula (3) in addition to the structural unit represented by Structural Formula (1) increases the flexural strength of an unsintered fabricated object, such as a solidified product or a green body derived from a solidified product.

Similarly to the structural unit represented by Structural Formula (1), the structural unit represented by Structural Formula (3) is hydrophobic, and thus, the solubility of the resin in organic solvents is also improved.

From these viewpoints, in the resin, the total amount of the structural unit represented by Structural Formula (1) and the structural unit represented by Structural Formula (3) is preferably 60 mol % or more, more preferably 65 mol % or more, still more preferably 70 mol % or more, particularly preferably 75 mol % or more, and most preferably 80 mol % or more, with respect to the total amount of the structural unit represented by Structural Formula (1), the structural unit represented by Structural Formula (3), and the structural unit represented by Structural Formula (4).

The same applies to a resin not including the structural unit represented by Structural Formula (3) or Structural Formula (4), and the amount of a structural unit that is not included may be set to zero to calculate the above-mentioned ratio.

In the resin including the structural unit represented by Structural Formula (4) in addition to the structural unit represented by Structural Formula (1), the hydroxyl group in the structural unit represented by Structural Formula (4) increases the affinity with the metal particles in the powder layer to which the fabrication liquid is to be applied. This further increases the flexural strength of the unsintered fabricated object, such as a solidified product or a green body derived from a solidified product, and further increases the density of the unsintered fabricated object as well as the density of the sintered fabricated object. From these viewpoints, in the resin, the amount of the structural unit represented by Structural Formula (4) is preferably 5 mol % or more, more preferably 15 mol % or more, and still more preferably 25 mol % or more, with respect to the total amount of the structural unit represented by Structural Formula (1), the structural unit represented by Structural Formula (3), and the structural unit represented by Structural Formula (4).

However, the structural unit represented by Structural Formula (4) is hydrophilic. As a result, if the ratio of the structural unit represented by Structural Formula (4) increases, improvement of the solubility of the resin including the structural unit represented by Structural Formula (1) is suppressed in a case where the fabrication liquid contains an organic solvent, and accordingly, the reduction in the viscosity of the fabrication liquid is suppressed. From this viewpoint, in the resin, the amount of the structural unit represented by Structural Formula (4) is preferably 40 mol % or less, more preferably 35 mol % or less, still more preferably 30 mol % or less, particularly preferably 25 mol % or less, and most preferably 20 mol % or less, with respect to the total amount of the structural unit represented by Structural Formula (1), the structural unit represented by Structural Formula (3), and the structural unit represented by Structural Formula (4).

The same applies to a resin not including the structural unit represented by Structural Formula (3), and the amount of a structural unit that is not included may be set to zero to calculate the above-mentioned ratio.

Specific examples of the resin including the structural unit represented by Structural Formula (1) include, but are not limited to, a polyvinyl acetate resin, a partially saponified polyvinyl acetate resin, and a polyvinyl butyral resin. Among these, the polyvinyl acetate resin and a predetermined partially saponified polyvinyl acetate resin are preferable because these resins can reduce the viscosity of the fabrication liquid.

The "predetermined partially saponified polyvinyl acetate resin" is preferably a polyvinyl acetate resin in which a portion of 75 mol % or more of the amount of the structural unit represented by Structural Formula (1) is saponified, and more preferably a polyvinyl acetate resin in which a portion of 80 mol % or more of the amount of the structural unit represented by Structural Formula (1) is saponified, with respect to the total amount of the structural unit represented by Structural Formula (1) and the structural unit represented by Structural Formula (4). Each of these resins may be used alone or in combination with others. Commercially available resins and synthetic resins can both be used.

Herein, the polyvinyl acetate resin is a resin that includes the structural unit represented by Structural Formula (1), but substantially does not include the structural unit represented by Structural Formula (3) or the structural unit represented by Structural Formula (4). The partially saponified polyvinyl acetate resin is a resin that includes the structural unit represented by Structural Formula (1) and the structural unit represented by Structural Formula (4), but substantially does not include the structural unit represented by Structural Formula (3). The polyvinyl butyral resin is a resin that includes the structural unit represented by Structural Formula (1) and the structural unit represented by Structural Formula (3), or a resin that includes the structural unit represented by Structural Formula (1), the structural unit represented by Structural Formula (3), and the structural unit represented by Structural Formula (4).

The partially saponified polyvinyl acetate resin is a resin obtained by partially saponifying a polyvinyl acetate resin. Herein, in the partially saponified polyvinyl acetate resin, the amount of the structural unit represented by Structural Formula (4) is 40 mol % or less, preferably 35 mol % or less, more preferably 30 mol % or less, still more preferably 25 mol % or less, and particularly preferably 20 mol % or less, with respect to the total amount of the structural unit represented by Structural Formula (1) and the structural unit represented by Structural Formula (4). In other words, the partially saponified polyvinyl acetate resin in the present specification has a degree of saponification of 40 or less, preferably 35 or less, more preferably 30 or less, still more preferably 25 or less, and particularly preferably 20 or less.

The content of the resin including the structural unit represented by Structural Formula (1) is preferably 5.0 mass % or more, more preferably 7.0 mass % or more, still more preferably 10.0 mass % or more, and particularly preferably 11.0 mass % or more, with respect to the total mass of the fabrication liquid. The content of the resin including the structural unit represented by Structural Formula (1) is preferably 30.0 mass % or less, more preferably 25.0 mass % or less, and particularly preferably 20.0 mass % or less, with respect to the total mass of the fabrication liquid.

If the content of the resin including the structural unit represented by Structural Formula (1) is 5.0 mass % or more, the flexural strength of an unsintered fabricated object, such as a solidified product or a green body derived from a solidified product, further increases.

If the content of the resin including the structural unit represented by Structural Formula (1) is 30.0 mass % or less, the viscosity of the fabrication liquid further decreases, and thus, it is possible to appropriately discharge the fabrication liquid by an inkjet technique, for example.

In a resin in which the total amount of the structural unit represented by Structural Formula (1) and the structural unit represented by Structural Formula (3) is 95 mol % or more with respect to the total amount of the structural unit represented by Structural Formula (1), the structural unit represented by Structural Formula (3), and the structural unit represented by Structural Formula (4), the solubility of the resin in organic solvents is improved and the viscosity of the fabrication liquid is reduced, so that a large mass of the resin can be contained (for example, 15.0 mass % or more or 20.0 mass % or more with respect to the mass of the fabrication liquid). This further increases the flexural strength of an unsintered fabricated object, such as a solidified product or a green body derived from a solidified product.

The amount (mol %) of the structural unit represented by each structural formula in the resin can be determined by the polyvinyl alcohol test method described in JIS-K6276-1994, for example.

—Resin Including Structural Unit Represented by Structural Formula (2)—

The resin including the structural unit represented by Structural Formula (2) is arranged in the powder layer by applying the fabrication liquid to the powder layer containing the metal particles. Subsequently, the obtained product is subjected to an appropriate heating process in accordance with the softening point of the resin, so that the resin functions as a binder that binds the metal particles in a region where the fabrication liquid is applied. Thus, an unsintered fabricated object, such as a solidified product or a green body derived from a solidified product, is formed. Such an unsintered fabricated object is formed of the resin including the structural unit represented by Structural Formula (2) including a five-membered lactam ring structure that has a high affinity with metals, and thus, the metal particles are firmly bound, and accordingly, the flexural strength is increased.

If the temperature profile is appropriately controlled, the resin including the structural unit represented by Structural Formula (2) has excellent thermal decomposition properties, so that the resin is properly removed in a degreasing process. As a result, the density in a sintered body produced by the subsequent sintering process is improved. Therefore, if metal particles, which are a material that is assumed to be sintered or is preferably sintered, are used as the material (base material) for forming a fabricated object, the obtained effects are enhanced. Specifically, in the resin including the structural unit represented by Structural Formula (2), if the temperature is raised from 30° C. to 550° C., it is preferable that 95 mass % or more of the resin is thermally decomposed, and it is more preferable that 97 mass % or more of the resin is thermally decomposed.

However, the resin including the structural unit represented by Structural Formula (2) may form a crosslinked structure depending on the temperature conditions (for example, heating conditions of 160° C. or higher). This crosslinked structure may suppress the effect of high thermal decomposition. Therefore, if metal particles, which are materials that are assumed to be sintered or are preferably sintered, are used as the material (base material) for forming a fabricated object, from the viewpoint of ease of handling, it may be preferable to use a resin including the structural unit represented by Structural Formula (1) rather than a resin including the structural unit represented by Structural Formula (2).

The resin including the structural unit represented by Structural Formula (2), which has a five-membered lactam ring structure, has improved solubility in a specific organic solvent (mainly a polar solvent), and accordingly, can reduce the viscosity of the fabrication liquid, so that it is possible to appropriately discharge the fabrication liquid by an inkjet technique, for example. If the resin including the structural unit represented by Structural Formula (2) is used in combination with Component 1 (cyclic esters (lactones)) and Component 2 (glycol diethers) as organic solvents, the viscosity of the fabrication liquid can be reduced. Thus, the viscosity of the fabrication liquid can be reduced, so that a large mass of the resin including the structural unit represented by Structural Formula (2) can be contained in the fabrication liquid (for example, 15.0 mass % or more with respect to the mass of the fabrication liquid). This further increases the flexural strength of an unsintered fabricated object, such as a solidified product or a green body derived from a solidified product.

The softening point of the resin including the structural unit represented by Structural Formula (2) is preferably 70° C. or higher, more preferably 80° C. or higher, and still more preferably 90° C. or higher. The softening point of the resin including the structural unit represented by Structural Formula (2) is preferably 180° C. or lower, more preferably 170° C. or lower, and still more preferably 160° C. or lower.

The number average molecular weight (Mn) of the resin including the structural unit represented by Structural Formula (2) is preferably 3,000 or more and 50,000 or less, and more preferably 5,000 or more and 40,000 or less. Regarding the number average molecular weight (Mn) of the resin including the structural unit represented by Structural Formula (2), if the number average molecular weight (Mn) is within the above-mentioned range, it is possible to achieve increased strength and fabrication accuracy as well as reduced viscosity of the fabrication liquid and increased resin concentration in the fabrication liquid.

A specific example of the resin including the structural unit represented by Structural Formula (2) includes, but is not limited to, a polyvinylpyrrolidone resin. As the resin including the structural unit represented by Structural Formula (2), an appropriately synthesized resin may be used, or a commercially available resin may be used.

The content of the resin including the structural unit represented by Structural Formula (2) is preferably 7.0 mass % or more, more preferably 10.0 mass % or more, still more preferably 11.0 mass % or more, and particularly preferably 13.0 mass % or more, with respect to the total mass of the fabrication liquid. The content of the resin including the structural unit represented by Structural Formula (2) is preferably 25.0 mass % or less, more preferably 20.0 mass % or less, and still more preferably 15.0 mass % or less, with respect to the total mass of the fabrication liquid.

If the content of the resin including the structural unit represented by Structural Formula (2) is 7.0 mass % or more with respect to the total mass of the fabrication liquid, the flexural strength of an unsintered fabricated object, such as a solidified product or a green body derived from a solidified product, further increases.

If the content of the resin including the structural unit represented by Structural Formula (2) is 25.0 mass % or less with respect to the total mass of the fabrication liquid, the viscosity of the fabrication liquid further decreases, and thus, it is possible to appropriately discharge the fabrication liquid by an inkjet technique, for example.

<<<Organic Solvent>>>

The organic solvent is a liquid component used to keep the fabrication liquid in a liquid state at room temperature.

The fabrication liquid is preferably a non-aqueous fabrication liquid containing the organic solvent. The term "non-aqueous fabrication liquid" as used herein refers to a fabrication liquid that contains an organic solvent as a liquid component of the fabrication liquid, and in which the organic solvent is the component having the largest mass among the liquid components. The content of the organic solvent with respect to the content of the liquid components in the fabrication liquid is preferably 90.0 mass % or more, and more preferably 95.0 mass % or more. Such a non-aqueous fabrication liquid is suitable, especially because the solubility of the resin including the structural unit represented by Structural Formula (1) is improved and the viscosity of the fabrication liquid is reduced.

The non-aqueous fabrication liquid may also be referred to as a fabrication liquid that substantially does not contain water, for example. Thus, the fabrication liquid can be applied to a material forming metal particles, even if the material is a highly active metal, in other words, a water-repellent material (for example, aluminum, zinc, or magnesium). As an example, when aluminum contacts water, aluminum forms a film of aluminum hydroxide. Accordingly, if the water content in the fabrication liquid is high, there is a problem in that the sintered density of a sintered body decreases. However, such a problem is solved by using a non-aqueous fabrication liquid. As another example, when aluminum contacts water, aluminum generates hydrogen, and thus, aluminum is difficult to handle. However, such a problem is also solved by using a non-aqueous fabrication liquid.

The organic solvent is not particularly limited and can be appropriately selected according to a purpose. Examples of the organic solvent include, but are not limited to, n-octane, m-xylene, solvent naphtha, diisobutylketone, 3-heptanone, 2-octanone, acetylacetone, butyl acetate, amyl acetate, n-hexyl acetate, n-octyl acetate, ethyl butyrate, ethyl valerate, ethyl caprylate, ethyl octanoate, ethyl acetoacetate, ethyl 3-ethoxypropionate, diethyl oxalate, diethyl malonate, diethyl succinate, diethyl adipic acid, bis 2-ethylhexyl maleate, triacetin, tributyrin, propylene glycol monomethyl ether acetate, ethylene glycol monobutyl ether acetate, dibutyl ether, 1,2-dimethoxybenzene, 1,4-dimethoxybenzene, diethylene glycol monobutyl ether, diethylene glycol dimethyl ether, triethylene glycol dimethyl ether, 2-methoxy-1-methylethyl acetate, γ-butyrolactone, propylene carbonate, cyclohexanone, and butyl CELLOSOLVE. Each of these may be used alone or in combination with others.

If a resin including the structural unit represented by Structural Formula (1) is used, an organic solvent to be used in combination is not particularly limited. For example, it is preferable to use an organic solvent including at least one structure selected from the group including an alkoxy group, an ether bond, and an ester bond. It is more preferable to use an organic solvent including the ether bond, and it is particularly preferable to use a structure including alkylene glycol dialkyl ethers. When such an organic solvent is used, the solubility of the resin including the structural unit represented by Structural Formula (1) is further improved, and accordingly, the viscosity of the fabrication liquid can be further reduced, so that, for example, the fabrication liquid can be appropriately discharged by an inkjet technique.

As used herein, "alkylene glycol dialkyl ethers" are represented by R1—(O—R2)m—OR3. Here, R1 and R3 are each independently an alkyl group having 1 or more and 5 or less carbon atoms, which may be linear or branched, and preferably have 1 or 2 carbon atoms. R2 is an alkylene group having 2 or more and 5 or less carbon atoms, which may be linear or branched, and preferably has 2 or 3 carbon atoms. m represents an integer of 1 or more and 5 or less, and is more preferably 2 or 3.

Specific examples of the alkylene glycol dialkyl ethers include, but are not limited to, diethylene glycol dimethyl ether, triethylene glycol dimethyl ether, diethylene glycol ethyl methyl ether, and diethylene glycol butyl methyl ether. Among these, diethylene glycol dimethyl ether and triethylene glycol dimethyl ether are preferable, and triethylene glycol dimethyl ether is more preferable.

If a resin including the structural unit represented by Structural Formula (2) is used, an organic solvent to be used in combination is preferably a polar solvent. Specifically, it is preferable to use at least one selected from Components 1 which is a group including cyclic esters (lactones), cyclic ketones, and alkylene glycol monoalkyl ethers, and it is more preferable to further use at least one selected from Components 2, which includes alkylene glycol dialkyl ethers, in addition to the at least one selected from Components 1. When such an organic solvent is used, the solubility of the resin including the structural unit represented by Structural Formula (2) is improved, and accordingly, the viscosity of the fabrication liquid can be reduced, so that, for example, the fabrication liquid can be appropriately discharged by an inkjet technique. From the viewpoint of further improving the solubility of the resin including the structural unit represented by Structural Formula (2), Components 1 are preferably a group including cyclic esters (lactones) and cyclic ketones.

If a resin including a structural unit represented by Structural Formula (2) is used and both at least one selected from Components 1 and at least one selected from Components 2 are used as organic solvents, the mass ratio of the total amount of Component 1 and the total amount of Component 2 (Component 1/Component 2) is preferably from 60/40 to 100/0. This is because when the mass ratio of the total amount of Component 1 and the total amount of Component 2 is from 60/40 to 100/0, the solubility of the resin including the structural unit represented by Structural Formula (2) is further improved, and accordingly, the viscosity of the fabrication liquid can be further reduced.

Specific examples of Component 1, which is the group including cyclic esters (lactones), cyclic ketones, and alkylene glycol monoalkyl ethers, include, but are not limited to, γ-butyrolactone, propylene carbonate, and cyclohexanone.

Specific examples of Component 2, which is the group including alkylene glycol dialkyl ethers include, but are not limited to, diethylene glycol dimethyl ether, triethylene glycol dimethyl ether, diethylene glycol ethyl methyl ether, and diethylene glycol butyl methyl ether. Among these, diethylene glycol dimethyl ether and triethylene glycol dimethyl ether are preferable.

As used herein, "alkylene glycol monoalkyl ethers" are represented by R4—(O—R5)n—OH. Here, R4 is an alkyl group having 1 or more and 5 or less carbon atoms, and may be linear or branched. R5 is an alkylene group having 2 or more and 5 or less carbon atoms, and may be linear or branched. n represents an integer of 1 or more and 5 or less.

When a resin including the structural unit represented by Structural Formula (2) is used, the effect of the types of the organic solvent to be used in combination is greater than in a case where a resin including the structural unit represented by Structural Formula (1) is used. Thus, to further reduce the viscosity of the fabrication liquid, it is desirable to selectively use the above-listed organic solvents (Component 1 and Component 2). Therefore, from the viewpoint of the possibility of expanding the range of material selection for producing the fabrication liquid, a resin including the structural unit represented by Structural Formula (1) is preferably used rather than a resin including the structural unit represented by Structural Formula (2).

The content of the organic solvent is preferably 60.0 mass % or more and 95.0 mass % or less, and more preferably 70.0 mass % or more and 95.0 mass % or less, with respect to the total amount of the fabrication liquid. If the content of the organic solvent is 60.0 mass % or more and 95.0 mass % or less with respect to the total amount of the fabrication liquid, the solubility of the resin is improved, and accordingly, the viscosity of the fabrication liquid can be further reduced, so that the fabrication liquid can be appropriately discharged by an inkjet technique, for example. In addition, it is possible to suppress drying of the fabrication liquid in the application unit, and a fabrication liquid having excellent discharge stability can be provided.

The mass ratio of the amount of the organic solvent and the amount of the resin (organic solvent/resin) is preferably 75/25 or more and 95/5 or less. If the mass ratio of the amount of the organic solvent and the amount of the resin is 75/25 or more, the solubility of the resin is improved, and accordingly, the viscosity of the fabrication liquid can be further reduced, so that the fabrication liquid can be appropriately discharged by an inkjet technique, for example. If the mass ratio of the amount of the organic solvent and the amount of the resin is 95/5 or less, the flexural strength of an unsintered fabricated object, such as a solidified product or a green body derived from a solidified product is increased.

The total content of the organic solvent and the resin is preferably 90.0 mass % or more, more preferably 95.0 mass % or more, still more preferably 99.0 mass % or more, and particularly preferably 99.5 mass % or more, with respect to the total mass of the fabrication liquid. The fabrication liquid may be substantially free of components other than the organic solvent and the resin. The expression "the fabrication liquid is substantially free of components other than the organic solvent and the resin" means that components other than the organic solvent and the resin are intended not to be used as materials for producing the fabrication liquid, or that the content of components other than the organic solvent and the resin in the fabrication liquid is below a detection limit when the content is determined by using a known common general technique.

If the total content of the organic solvent and the resin is 90.0 mass % or more with respect to the total mass of the fabrication liquid, the content of the resin contained in the fabrication liquid increases, and the flexural strength of an unsintered fabricated object, such as a solidified product or a green body derived from a solidified product, further increases. If the content of components other than the organic solvent and the resin (for example, materials, such as metal fine particles, which are insoluble in the fabrication solution) is low, or if components other than the organic solvent and the resin are substantially not contained, the viscosity of the fabrication liquid decreases, the discharge stability of the fabrication liquid is improved, and the storage stability of the fabrication liquid is also improved.

The viscosity of the organic solvent is not particularly limited and can be appropriately selected according to a purpose, but a low viscosity is preferable. Specifically, at 25° C., the viscosity is preferably 5.0 mPa*s or more and 50.0 mPa*s or less, and more preferably 8.0 mPa*s or more and 30.0 mPa*s or less. If the viscosity of the organic solvent is within the above-mentioned range, the viscosity of a fabrication liquid containing the organic solvent can also be easily reduced, so that the fabrication liquid can be stably discharged from the application unit such as an inkjet head. When the fabrication liquid is accurately discharged, the flexural strength of an unsintered fabricated object, such as a solidified product or a green body derived from a solidified product, further increases, and the dimensional accuracy also increases.

The viscosity can be measured according to JIS K7117, for example.

The boiling point of the organic solvent is not particularly limited and can be appropriately selected according to a purpose, but a high boiling point is preferable. Specifically, the boiling point is preferably 150° C. or higher, and more preferably 180° C. or higher. If the fabrication liquid is discharged by an inkjet technique or the like, such a high boiling point of the organic solvent is preferable, because the fabrication liquid can be prevented from drying at a nozzle or near a nozzle, and clogging of the nozzle due to deposited resin can be suppressed.

Examples of the organic solvent having a high boiling point include, but are not particularly limited to, γ-butyrolactone (boiling point: 204° C.), propylene carbonate (boiling point: 242° C.), cyclohexanone (boiling point: 155.6° C.), diethylene glycol dimethyl ether (boiling point: 162° C.), and triethylene glycol dimethyl ether (boiling point: 216° C.).

<<Additives>>

Depending on a purpose, the fabrication liquid may appropriately contain additives such as a surfactant, an anti-drying agent, a viscosity regulator, a penetrant, a defoamer, a pH regulator, a preservative, a fungicide, a colorant, a preservative, and a stabilizer. Such conventionally known materials may be used.

<<Other Components>>

Other components contained in the fabrication liquid include water, for example.

The other components contained in the fabrication liquid can be appropriately selected in consideration of various conditions such as the type of application unit, the frequency of use of the components, and the amount of the components. For example, if a fabrication liquid is applied by a liquid discharge method, the other components can be selected in consideration of an influencing condition, such as clogging of a nozzle of a liquid discharge head.

—Water—

The fabrication liquid is substantially free of water. As used herein, the expression "substantially free of water" means that the water content is 10.0 mass % or less with respect to the total mass of the fabrication liquid. The water content in the fabrication liquid is preferably 5.0 mass % or less, more preferably 3.0 mass % or less, and still more preferably 1.0 mass % or less, with respect to the total mass of the fabrication liquid, and it is particularly preferable that the fabrication liquid does not contain water.

By using a fabrication liquid that is substantially free of water, the solubility of the resin is further improved, and accordingly, it is possible to further reduce the viscosity of the fabrication liquid. The formation of a hydrogel containing a large amount of water around the resin is suppressed, and accordingly, an increase in the viscosity of the fabrication liquid is suppressed. Therefore, for example, the fabrication liquid can be appropriately discharged by an inkjet technique.

<<Method of Manufacturing Fabrication Liquid>>

A method of producing the fabrication liquid is not particularly limited and can be appropriately selected according to a purpose. An example thereof includes, but is not limited to, a method of mixing and stirring the above-described materials.

<<Physical Properties of Fabrication Liquid>>

The viscosity of the fabrication liquid is not particularly limited and can be appropriately selected according to a purpose, but a low viscosity is preferable. Specifically, at 25° C., the viscosity is preferably 5 mPa*s or more and 50 mPa*s or less, more preferably 5 mPa*s or more and 40 mPa*s or less, and still more preferably 5 mPa*s or more and 30 mPa*s or less. If the viscosity of the organic solvent is within the above-mentioned range, the fabrication liquid is stably discharged from the application unit such as the inkjet head. When the fabrication liquid is accurately discharged, the flexural strength of an unsintered fabricated object, such as a solidified product or a green body derived from a solidified product, further increases, and the dimensional accuracy also increases.

The viscosity can be measured according to JIS K7117, for example.

The surface tension of the fabrication liquid is not particularly limited and can be appropriately selected according to a purpose, but is preferably 40 mN/m or less, and more preferably 10 mN/m or more and 30 mN/m or less at 25° C. If the surface tension of the fabrication liquid is 40 mN/m or less, the fabrication liquid is stably discharged from the application unit such as the inkjet head. When the fabrication liquid is accurately discharged, the flexural strength of an unsintered fabricated object, such as a solidified product or a green body derived from a solidified product, further increases, and the dimensional accuracy also increases.

The surface tension can be measured by, for example, DY-300 manufactured by Kyowa Interface Science Co., Ltd.

In the lamination fabricating method according to an embodiment of the present disclosure, by repeatedly performing a powder layer forming step and an application step, it is possible to easily and efficiently form a complicated fabricated object with high dimensional accuracy, while maintaining a shape before sintering or the like.

<Base Layer Forming Step and Base Layer Forming Unit>

A base layer forming step in the present disclosure is a step of forming a base layer, before the powder layer forming step.

A base layer forming unit in the present disclosure is a unit that forms a base layer before the powder layer forming step.

The base layer forming step in the present disclosure is suitably performed by the base layer forming unit.

The same or similar unit as in the powder layer forming step may be used as the base layer forming unit, or a unit different from the unit in the powder layer forming step may be used as the base layer forming unit.

In the lamination fabricating method according to an embodiment of the present disclosure, a powder filling rate of a base layer obtained by the base layer forming step is higher than a powder filling rate of the powder layer in the powder layer forming step. The powder filling rate is a concept similar to the atomic packing factor (void ratio) in crystallography.

The powder filling rate of the base layer obtained by the base layer forming step can be calculated by using a volume obtained from the area of a fabrication stage where the base layer is formed and the distance between the fabrication stage and the base layer forming unit, the mass of the powder for three-dimensional fabrication, and the density of the material of the powder for three-dimensional fabrication. Specifically, the powder filling rate of the base layer can be calculated by using the following equation:

$$A=D/(B \times C)/E,$$

where the symbols used are defined as follows.
A: powder filling rate of base layer
B: area of fabrication stage
C: average distance between fabrication stage and base layer forming unit
D: mass of powder for three-dimensional fabrication in base layer on fabrication stage
E: density of material of powder for three-dimensional fabrication The powder filling rate of the powder layer in the powder layer forming step can be calculated by using a mass of the powder layer obtained by subtracting the mass when the base layer alone is formed from the total mass of the base layer and the powder layer, the area of the fabrication stage where the powder layer is formed, the average thickness of one layer in the powder layer, the number of layers, and the density of the material of the powder for three-dimensional fabrication. Specifically, the powder filling rate of the base layer can be calculated by using the following equation:

$$F=(I-D)/(B \times G \times H)/E,$$

where the symbols used are defined as follows.
B: area of fabrication stage
D: mass of powder for three-dimensional fabrication in base layer on fabrication stage
E: density of material of powder for three-dimensional fabrication
F: powder filling rate of powder layer
G: average thickness of one layer in powder layer
H: number of layers
I: total mass of powder for three-dimensional fabrication in base layer and powder layer on fabrication stage The powder filling rate of the base layer is not particularly limited. From the viewpoint of preventing the base layer from being compressed, however, the powder filling rate of the base layer is preferably 50% or more and 85% or less.

The powder filling rate of the powder layer is not particularly limited as long as the powder filling rate of the powder layer is lower than the powder filling rate of the base layer. However, the powder filling rate of the powder layer is preferably 50% or more and 85% or less.

The average thickness of the base layer is not particularly limited and can be appropriately selected according to a purpose. However, from the viewpoint of obtaining a base layer with a sufficiently high powder filling rate, the average thickness of the base layer is preferably 2.0 mm or less.

The average thickness of the base layer corresponds to the average distance between the fabrication stage and the base layer forming unit in the formation of the base layer.

The average thickness of the base layer can be measured according to a known method. An example of the known method includes, but is not limited to, a method of observing a cross section of a three-dimensional fabricated object by using a scanning electron microscope, a laser microscope, or the like. The average thickness of the base layer can also be obtained by using a clearance gauge to measure a gap between the base layer forming unit and the fabrication stage before the base layer and the powder layer are formed. In the case of this measuring method, it is possible to measure the thickness at four points located 20 mm inside the four corners of the fabrication stage, and calculate an average as the average thickness.

The average distance between the fabrication stage and the base layer forming unit in the base layer forming step is not particularly limited and may be appropriately selected depending on the intended purpose. From the viewpoint of sufficiently increasing the powder filling rate of the base layer, however, the average distance is preferably 0.3 mm or more and 2.0 mm or less, more preferably 0.8 mm or less. The reason why the powder filling rate of the base layer increases is considered to be that the powder for three-dimensional fabrication is compressed when passing through a path with such a reduced distance between the fabrication stage and the base layer forming unit, so that the powder filling rate can be increased. In addition, since the fabrication stage is made of a hard material such as metal, it is considered that the base layer is more easily compressed than the powder layer and the powder filling rate can be increased.

In the lamination fabricating method according to an embodiment of the present disclosure, from the viewpoint of preventing a fabricated object (or a fabrication layer) from contacting the base layer, it is preferable that the powder layer forming step is performed after the base layer forming step, and then, the powder layer forming step and the application step are repeatedly performed to form the fabricated object (or the fabrication layer). In other words, it is preferable that the powder layer is present between the base layer and the fabricated object (or the fabrication layer). The base layer obtained in the base layer forming step and the powder layer obtained in the powder layer forming step are different in forming method and density. Thus, a bottom portion of the powder layer contacting the base layer is affected by the base layer, which may cause a problem in the lamination in the powder layer forming step and the application step. From the viewpoint of stably performing the powder layer forming step and the applying step, it is preferable that the powder layer is provided between the base layer and the fabricated object (or the fabrication layer).

The powder layer can be formed between the base layer and the fabricated object (or the fabrication layer) by the same method as in the powder layer forming unit. The number of powder layers present between the base layer and the fabricated object is not particularly limited and can be appropriately selected according to a purpose, but is preferably 10 layers or more.

The average thickness of a fabricated object obtained by the lamination fabricating method and the lamination fabricating apparatus according to the present disclosure is not particularly limited, and can be appropriately set according to a purpose.

The method of measuring the average thickness of the fabricated object is not particularly limited and can be appropriately selected according to a purpose. However, a caliper (manufactured by Mitutoyo Corporation) can be used to measure the thickness of the fabricated object at three points, that is, at a central portion and at both end portions of the fabricated object, to calculate an average value of these values as the average thickness of the fabricated object.

The lamination fabricating method according to an embodiment and other embodiments of the present disclosure will be described with reference to FIGS. 1 to 5. However, the applications of the lamination fabricating method of the present disclosure are not limited to these embodiments.

In each drawing, the same reference numerals are used for the same constituent members, and redundant description may be omitted. The number, the position, the shape, and the like of the constituent members described below are not limited to those in the present embodiment, and can be suitably set to a preferable number, position, shape, and the like in implementing embodiments of the present disclosure.

FIG. 1 is a schematic plan view of a lamination fabricating apparatus according to an embodiment of the present disclosure.

FIG. 1 includes a forming unit 1 serving as a powder layer forming unit, a fabrication unit 5 serving as an application unit, a maintenance assembly 61, and a base member 7.

The forming unit 1 includes a powder chamber 11, a flattening roller 12 serving as a flattening unit, and a powder removal plate 13 serving as a removal unit. The powder chamber 11 includes a supply chamber 21, a fabrication chamber 22, a supply stage 23, and a fabrication stage 24.

The fabrication unit 5 includes a liquid discharge unit 50, a tank attachment unit 56, a tank 60, and slider units 72. The liquid discharge unit 50 includes a carriage 51, a liquid discharge head 52a, and a liquid discharge head 52b.

The maintenance assembly 61 includes caps 62 and a wiper 63.

The base member 7 includes a guide member 54, a guide member 55, side plates 70, and guide members 71.

Figure 2:
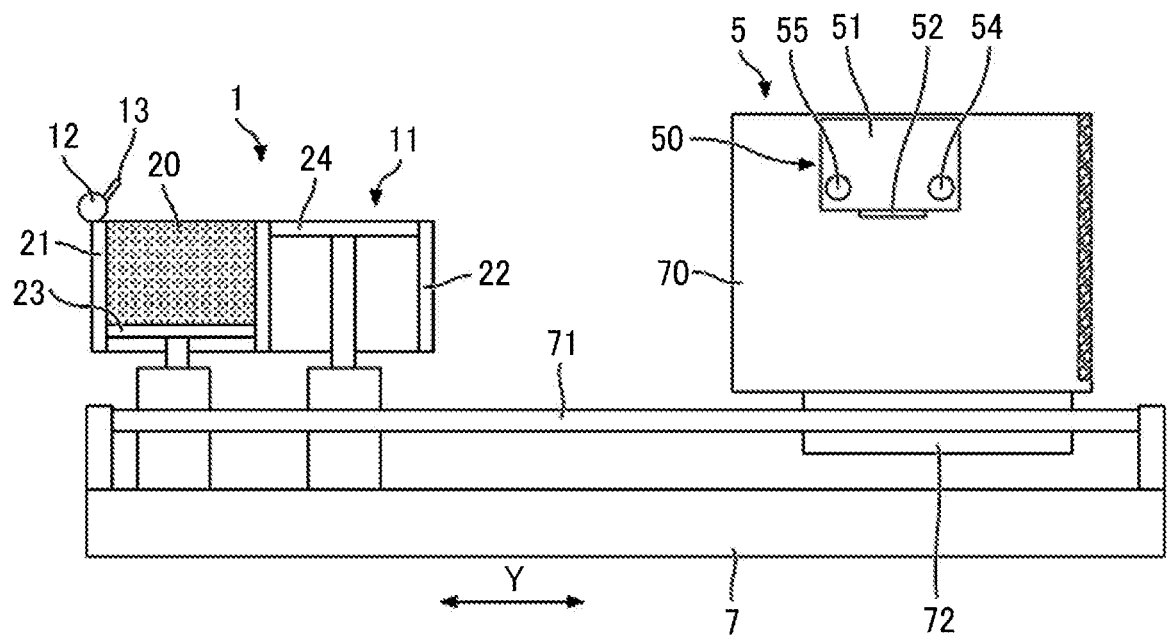
FIG. 2 is a schematic side view of a lamination fabricating apparatus according to an embodiment of the present disclosure.

FIG. 2 is a schematic side view of a lamination fabricating apparatus according to an embodiment of the present disclosure.

In addition to the components illustrated in FIG. 1, FIG. 2 illustrates a powder 20 serving as a powder for three-dimensional fabrication (hereinafter referred to as the "powder 20"). Description of the same components as those of FIG. 1 will be omitted where appropriate.

Figure 3:
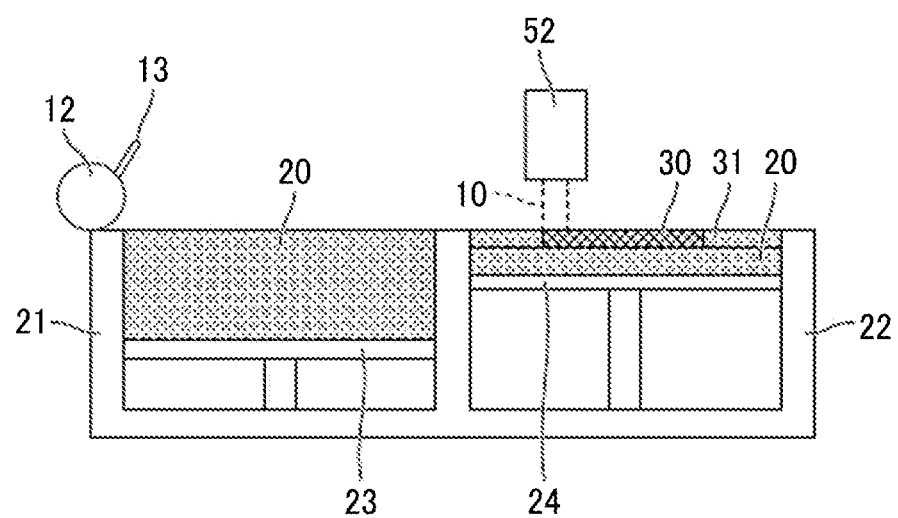
FIG. 3 is a schematic cross-sectional view of a forming unit of the lamination fabricating apparatus according to an embodiment of the present disclosure.

FIG. 3 is a schematic cross-sectional view of a forming unit of the lamination fabricating apparatus according to an embodiment of the present disclosure.

In addition to the components illustrated in FIGS. 1 and 2, FIG. 3 illustrates a fabrication layer 30 and a powder layer 31. Description of the same components as those of FIGS. 1 and 2 will be omitted where appropriate.

Figure 4:
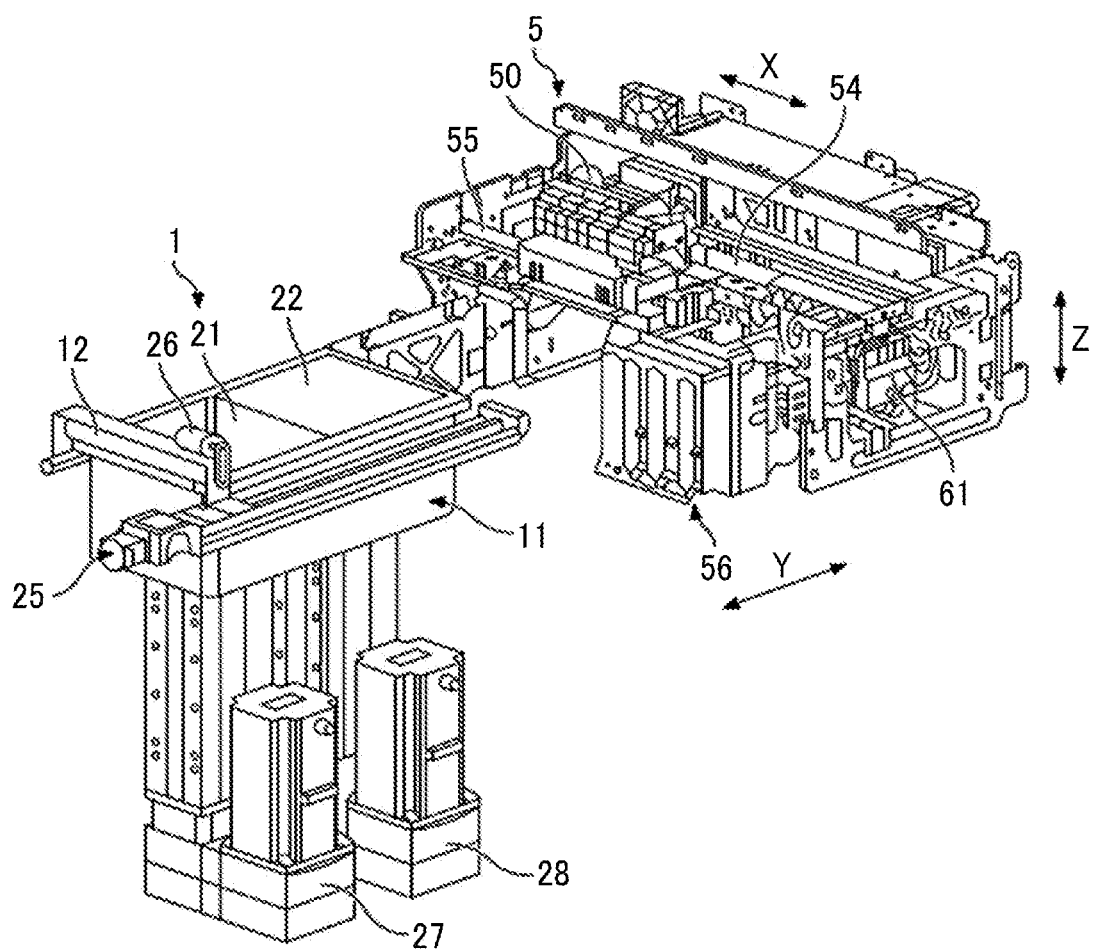
FIG. 4 is a perspective view of a lamination fabricating apparatus according to an embodiment of the present disclosure.

FIG. 4 is a perspective view of a main part of a lamination fabricating apparatus according to an embodiment of the present disclosure.

In addition to the components illustrated in FIGS. 1 to 3, FIG. 4 illustrates a reciprocating movement assembly 25, a motor 26, a motor 27, and a motor 28. Description of the same components as those of FIGS. 1 to 3 will be omitted where appropriate.

Figure 5:
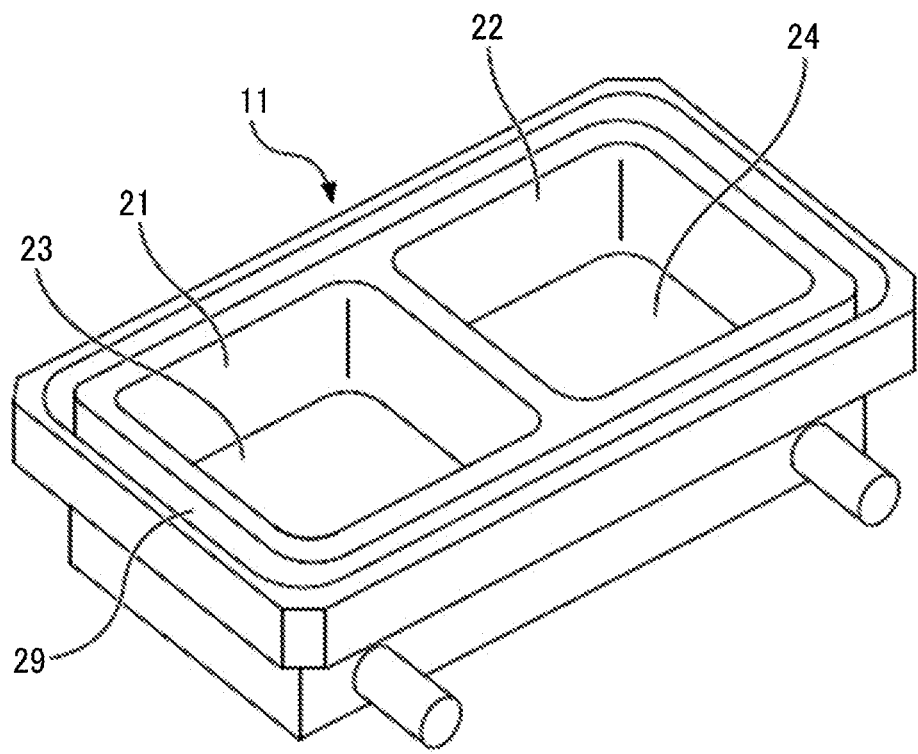
FIG. 5 is a schematic perspective of the forming unit of the lamination fabricating apparatus according to an embodiment of the present disclosure.

FIG. 5 is a schematic perspective of the forming unit of the lamination fabricating apparatus according to an embodiment of the present disclosure.

FIG. 5 illustrates a powder drop port 29, in addition to the components of the forming unit illustrated in FIGS. 1 to 4. Description of the same components as those of FIGS. 1 to 4 will be omitted where appropriate.

—Forming Unit—

In the forming unit 1, the powder layer 31 is formed from the powder for three-dimensional fabrication.

The powder chamber 11 of the forming unit 1 has a box shape and includes a chamber in which two top surfaces of the supply chamber 21 and the fabrication chamber 22 are opened. The supply stage 23 is arranged inside the supply chamber 21, the fabrication stage 24 is arranged inside the fabrication chamber 22, and the supply stage 23 and the fabrication stage 24 can be elevated and lowered. The supply stage 23 is elevated and lowered in an arrow Z direction (height direction) by the motor 27. Similarly, the fabrication stage 24 is elevated and lowered in the arrow Z direction by the motor 28.

A side surface of the supply stage 23 is arranged to contact an inner side surface of the supply chamber 21. A side surface of the fabrication stage 24 is arranged to contact an inner side surface of the fabrication chamber 22. The top surfaces of the supply stage 23 and the fabrication stage 24 are kept horizontal.

The powder drop port 29, which has a concave shape with an open top surface, is provided around the powder chamber 11. When the powder layer 31 is formed, surplus of the powder 20 from the powder 20 supplied by the flattening roller 12, drops into the powder drop port 29. The surplus powder 20 dropped into the powder drop port 29 is returned to a powder supply device that supplies the powder to the supply chamber 21.

For example, a hopper is arranged as the powder supply device on the supply chamber 21. The powder supply device supplies the supply chamber 21 with the powder 20 in a tank forming the powder supply device during initial operation of the object fabrication and when the amount of powder in the supply chamber 21 decreases. Examples of a powder conveyance method for supplying the powder 20 include, but are not limited to, a screw conveyor method utilizing a screw and an air conveyance method utilizing air. Equivalent devices other than the hopper may be applied.

The flattening roller 12 serving as a flattening unit flattens the powder layer 31. Specifically, the flattening roller 12 supplies the powder 20 supplied onto the supply stage 23 of the supply chamber 21 to the fabrication chamber 22, and then flattens the supplied powder 20 to form the powder layer 31 having a predetermined thickness. The flattening roller 12 is arranged to be reciprocally movable relative to a stage surface in an arrow Y direction along a stage surface (surface on which the powder 20 is laminated) of the fabrication stage 24, and is moved by the reciprocating movement assembly 25. The flattening roller 12 is rotationally driven by the motor 26.

The flattening roller 12 is a rod-shaped member longer than an internal dimension of the fabrication chamber 22 and the supply chamber 21 (that is, a width of a portion supplied with the powder 20 or a portion where the powder 20 is stored), and is reciprocally moved by the reciprocating movement assembly 25 in the Y-direction (sub-scanning direction) along the stage surface. The flattening roller 12 horizontally moves to pass through an area above the supply chamber 21 and the fabrication chamber 22 from an outside of the supply chamber 21 while being rotated by the motor 26. Therefore, the powder 20 is transferred and supplied onto the fabrication chamber 22, and the flattening roller 12 flattens the powder 20 while passing over the fabrication chamber 22, thus forming the powder layer 31.

The shape of the flattening unit is not particularly limited and can be appropriately selected according to a purpose, but a roller shape is preferable.

If the flattening unit has the shape of a roller (recoat roller), the diameter of the recoat roller is preferably 10 mm or more and 100 mm or less on the major axis.

The movement speed of the flattening unit is not particularly limited and can be appropriately selected according to a purpose, but is preferably 10 mm/s or more and 500 mm/s or less, and more preferably 200 mm/s.

The rotation direction of the flattening unit is preferably a rotation in a counter direction with respect to a surface of the powder for three-dimensional fabrication (surface on which the powder layer is laminated).

The rotation speed of the flattening unit is not particularly limited and can be appropriately selected according to a purpose, but is preferably 30 rpm or more and 500 rpm or less, and more preferably 240 rpm.

The powder removal plate 13 is a powder removal member that is arranged contactable with a circumferential surface of the flattening roller 12 to remove the powder 20 adhering to the flattening roller 12. The powder removal plate 13 moves together with the flattening roller 12 while contacting the circumferential surface of the flattening roller 12. The powder removal plate 13 is arranged to be in a counter direction with respect to a rotation direction of the flattening roller 12 when flattening the powder.

In the present embodiment, a configuration is employed in which the powder chamber 11 of the forming unit 1 includes the two chambers, that is, the supply chamber 21 and the fabrication chamber 22. However, a configuration may be employed in which the fabrication chamber 22 is simply provided, the powder is supplied from the powder supply device to the fabrication chamber 22, and the supplied powder is flattened by the flattening roller 12, which forms the flattening unit.

—Fabrication Unit—

In the fabrication unit 5, a fabrication liquid 10 is applied to the powder layer 31 formed by the forming unit 1. Thus, the fabrication layer 30 is fabricated.

The liquid discharge unit 50 in the fabrication unit 5 includes two liquid discharge heads (may be referred to as "head" hereinafter), that is, a liquid discharge head 52a and a liquid discharge head 52b (which may be one or three or more liquid discharge heads) which are mounted to the carriage 51 to discharge the fabrication liquid 10 onto the powder layer 31 on the fabrication stage 24.

The carriage 51 is movably held by the guide member 54 and the guide member 55. The guide member 54 and the guide member 55 are held by the side plates 70 on both sides to be freely elevated and lowered. The carriage 51 is reciprocated and moved by an X-direction scanning assembly in an arrow X direction (hereinafter, may be referred to as "X-direction", similarly, the arrow Y direction may be referred to as "Y-direction", and the arrow Z direction may be referred to as "Z-direction") which is a main scanning direction, via a main scanning movement mechanism including a motor, a pulley, and a belt.

The head 52a and the head 52b (hereinafter, may be collectively referred to as "head 52" unless distinction is desired) each include two nozzle rows in which a plurality of nozzles that discharge a liquid are arranged.

The two nozzle rows of the one head 52a discharge a fabrication liquid A and a fabrication liquid B. The two nozzle rows of the other head 52b discharge a fabrication liquid C and a fabrication liquid D, respectively. The head configuration is not limited to the above-described configuration of the head 52. The fabrication liquids A to D may each be the same, or may each be a combination of different fabrication liquids, and the composition of the fabrication liquids A to D is not limited.

A plurality of tanks 60 accommodating the fabrication liquid A, the fabrication liquid B, the fabrication liquid C, and the fabrication liquid D, respectively, are attached to the tank attachment unit 56, and the fabrication liquids are supplied to the head 52a and the head 52b via a supply tube or the like.

The fabrication unit 5 includes the slider units 72 movably held by the guide members 71 arranged on the base member 7, and the fabrication unit 5 allows for generally reciprocating movement in the Y-direction (sub-scanning direction) orthogonal to the X-direction. The fabrication unit 5 is generally reciprocated and moved in the Y-direction by a Y-direction scanning assembly.

The liquid discharge unit 50 is arranged, together with the guide member 54 and the guide member 55, to be elevated and lowered in the arrow Z direction, and elevated and lowered in the Z-direction by a Z-direction elevating and lowering assembly.

—Maintenance Assembly—

The maintenance assembly 61 is arranged on one side in the X-direction, and maintains and recovers the head 52 in the liquid discharge unit 50.

The maintenance method to be performed by the maintenance assembly 61 is not particularly limited. An example thereof includes, but is not limited to, a method of closely contacting the caps 62 with the nozzle surface of the head 52 (surface on which the nozzles are formed), sucking the fabrication liquid from the nozzles, and then wiping the nozzle surfaces with the wiper 63 to form a meniscus of each nozzle (with negative pressure inside the nozzles), to discharge powder clogged in the nozzles and discharge viscous fabrication liquid. When the fabrication liquid 10 is not discharged, the maintenance assembly 61 may cover the nozzle surface of the head 52 with the cap 62 to prevent the powder 20 from entering the nozzle and to prevent the fabrication liquid 10 from drying.

Figure 6:
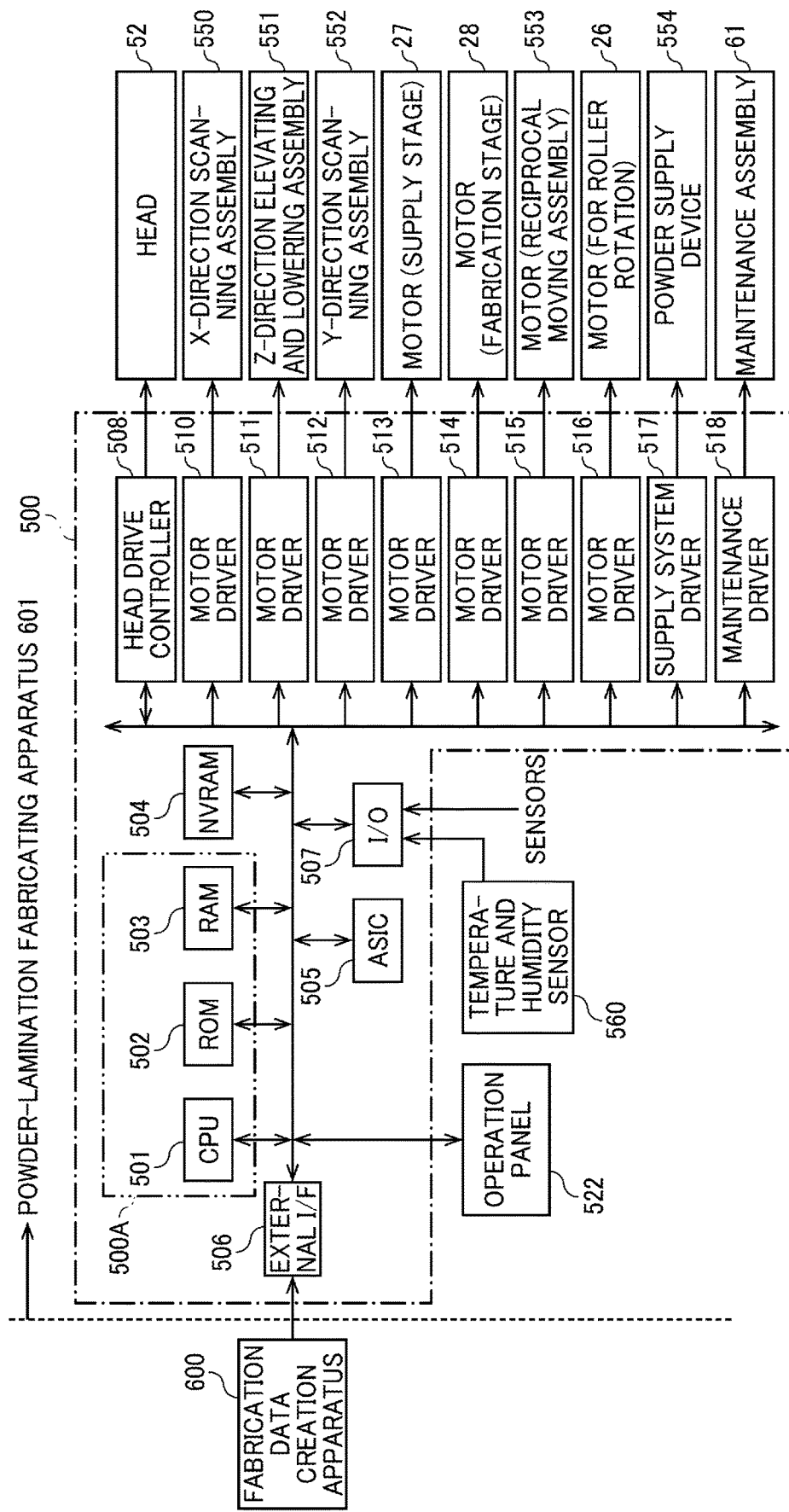
FIG. 6 is a block diagram of a controller of the lamination fabricating apparatus according to an embodiment of the present disclosure.

Next, an outline of a controller of the lamination fabricating apparatus will be described with reference to FIG. 6. FIG. 6 is a block diagram of the controller of the lamination fabricating apparatus according to an embodiment of the present disclosure.

FIG. 6 illustrates the controller 500, an operation panel 522, a temperature and humidity sensor 560, a fabrication data creation apparatus 600, and a lamination fabricating apparatus (powder-lamination fabricating apparatus) 601.

—Controller—

The controller 500 includes a main controller 500A including a CPU 501, a ROM 502, and a RAM 503, a non-volatile random access memory (NVRAM) 504, an ASIC 505, an I/F 506, an I/O 507, a head drive controller 508, a motor driver 510, a motor driver 511, a motor driver 512, a motor driver 513, a motor driver 514, a motor driver 515, a motor driver 516, a supply system driver 517, and a maintenance driver 518.

The CPU 501 generally controls the lamination fabricating apparatus.

The ROM 502 stores a program including a program for causing the CPU 501 to execute control of a three-dimensional fabrication operation including control according to an embodiment of the present disclosure, and stores other fixed data.

The RAM 503 temporarily stores fabrication data and the like.

The non-volatile random access memory (NVRAM) 504 retains data even when the apparatus is not connected to a power source.

The ASIC 505 performs image processing including various types of signal processing on image data, and in addition, processing of input and output signals used to control the entire apparatus.

The I/F 506 transmits and receives data and signals used when receiving fabrication data from the external fabrication data creation apparatus 600. The fabrication data creation apparatus 600 creates fabrication data in which a final-form fabricated object is sliced in each fabrication layer and includes an information processor such as a personal computer.

The I/O 507 of the controller 500 is input with a detection signal of the temperature and humidity sensor 560 and the like that detects a temperature and a humidity as an environmental condition of the apparatus, and detection signals of other sensors.

The head drive controller 508 controls driving of the head 52 of the liquid discharge unit 50.

The motor driver 510 drives a motor forming the X-direction scanning assembly 550 that moves the carriage 51 of the liquid discharge unit 50 in the X-direction (main scanning direction).

The motor driver 512 drives a motor forming the Y-direction scanning assembly 552 that moves the fabrication unit 5 in the Y-direction (sub-scanning direction).

The motor driver 511 drives a motor forming the Z-direction elevating and lowering assembly 551 that moves (elevates and lowers) the carriage 51 of the liquid discharge unit 50 in the Z-direction. The Z-direction elevating and lowering assembly 551 may elevate and lower the entire fabrication unit 5 in the arrow Z direction.

The motor driver 513 drives the motor 27 that elevates and lowers the supply stage 23.

The motor driver 514 drives the motor 28 that elevates and lowers the fabrication stage 24.

The motor driver 515 drives a motor 553 of the reciprocating movement assembly 25 that moves the flattening roller 12.

The motor driver 516 drives the motor 26 that rotationally drives the flattening roller 12.

The supply system driver 517 drives a powder supply device 554 that supplies the powder 20 to the supply chamber 21.

The maintenance driver 518 drives the maintenance assembly 61 of the liquid discharge unit 50.

The operation panel 522 is used to input and display information desired in the apparatus. A three-dimensional object fabrication system, which serves as an apparatus according to an embodiment of the present disclosure, includes the fabrication data creation apparatus 600 and the lamination fabricating apparatus (powder-lamination fabricating apparatus) 601.

Figure 7A:
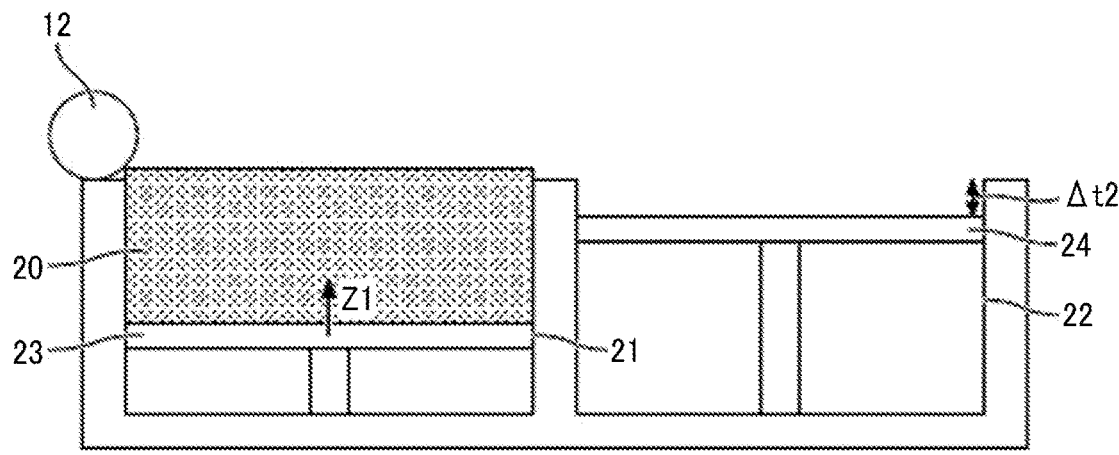
FIG. 7A is a schematic cross-sectional view of the forming unit, illustrating a base layer forming step according to an embodiment of the present disclosure.
Figure 7B:
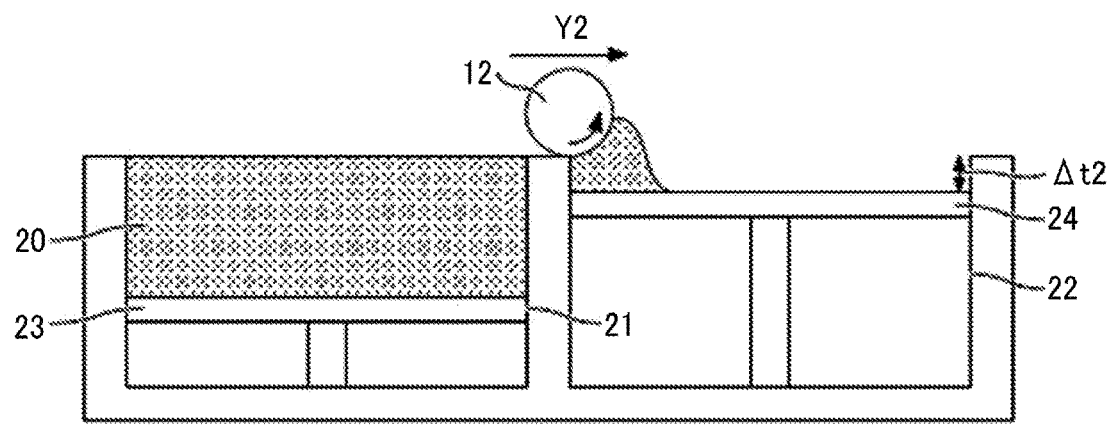
FIG. 7B is a schematic cross-sectional view of the forming unit, illustrating the base layer forming step.
Figure 7C:
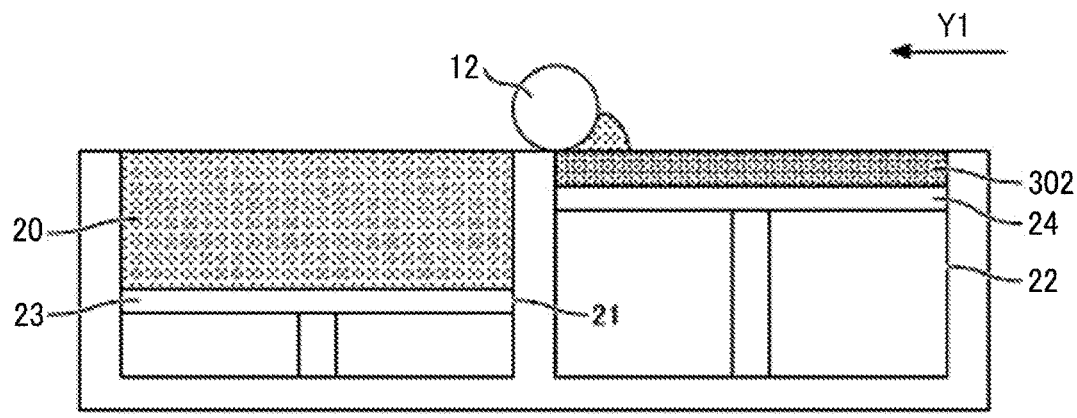
FIG. 7C is a schematic cross-sectional view of the forming unit, illustrating the base layer forming step.
Figure 7D:
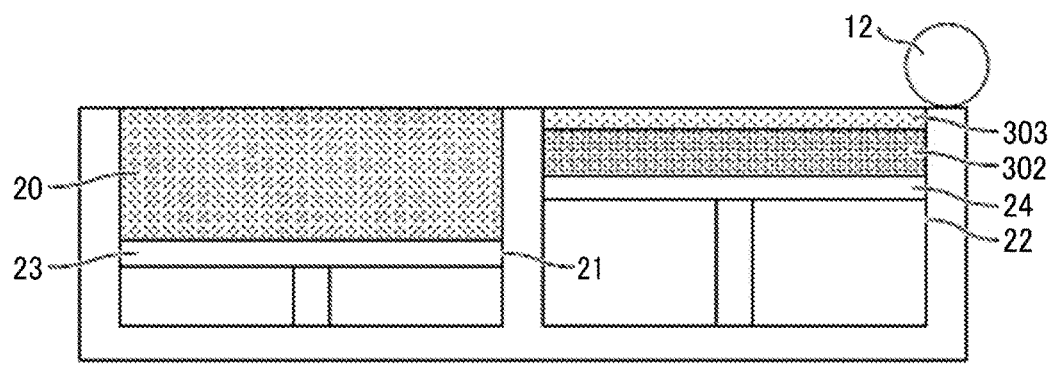
FIG. 7D is a schematic cross-sectional view of the forming unit, illustrating a step of forming a powder layer between the base layer and a fabrication layer (or a fabricated object) according to an embodiment of the present disclosure.

Next, each step of the lamination fabricating method according to an embodiment of the present disclosure is described with reference to FIGS. 7A to 7D and FIGS. 8A to 8E. FIGS. 7A to 7C are schematic cross-sectional views of a forming unit, illustrating a base layer forming step according to an embodiment of the present disclosure. FIG. 7D is a schematic cross-sectional view of the forming unit, illustrating a step of forming a powder layer between the base layer and a fabrication layer (or a fabricated object). FIGS. 8A to 8E are schematic cross-sectional views of the forming unit, illustrating each step of the lamination fabricating method according to an embodiment of the present disclosure.

First, the base layer forming step will be described. The base layer forming step is performed before the powder layer forming step and the application step.

As illustrated in FIG. 7A, the lowering distance of the fabrication stage 24 is set as an initial setting. The fabrication stage 24 is set so that the distance ($\Delta t2$) between a top surface of the fabrication stage 24 and a bottom portion (bottom tangential portion) of the flattening roller 12 is 0.8 mm. The supply stage 23 of the supply chamber 21 is elevated in the Z1 direction. The distance ($\Delta t2$) is not particularly limited, but may be 0.3 mm or more and 2.0 mm or less, and is preferably 0.8 mm or less.

Next, as illustrated in FIG. 7B, the flattening roller 12 is moved in parallel with the surface of the fabrication stage and in the Y2 direction. Thus, the powder 20 positioned above the level of the top surface of the supply chamber 21 is transferred and supplied until the powder 20 overflows from the fabrication chamber 22, and is uniformly flattened.

At this time, it is preferable to rotate the flattening roller 12 in the forward direction (arrow direction in FIG. 7B). The steps up to this point are referred to as an initial filling step.

Here, as illustrated in FIG. 7C, it is preferable to performed a spreading step in which the initial filling step is repeatedly performed on the flattened powder 20 without changing the height of the fabrication stage, to obtain the base layer 302. Performing the spreading step can obtain the base layer 302 having a high powder filling rate. The number of times of spreading (the number of repetitions of the initial filling step) is not particularly limited and may be appropriately set depending on the intended purpose. From the viewpoint of obtaining a base layer having a sufficiently high powder filling rate, the number of times of spreading is preferably two or more, and more preferably ten or more.

In this way, the base layer 302 having a predetermined thickness is formed on the fabrication stage 24. After the base layer 302 is formed, the flattening roller 12 moves in the Y1 direction and returns to the initial position.

It is preferable that only the powder layer forming step is performed after the base layer forming step to form the powder layer between the base layer and the fabrication layer (or the fabricated object).

As illustrated in FIG. 7D, the powder layer 303 may be formed on the base layer 302 obtained in the base layer forming step. The means for forming the powder layer between the base layer and the fabrication layer (or the fabricated object) may be the same or similar means as the powder layer forming means. The number of powder layers present between the base layer and the fabrication layer (or the fabricated object) is not particularly limited, but is preferably 10 or more.

The average thickness of one powder layer 303 between the base layer and the fabrication layer (or the fabricated object) is not particularly limited and may be appropriately selected depending on the intended purpose. For example, the average thickness of one powder layer may be 0.03 mm or more and 0.2 mm or less. The average thickness of one powder layer 303 between the base layer and the fabrication layer (or the fabricated object) may be measured by a known method, and may be obtained, for example, by measuring the distance between the powder layer forming unit and the upper surface of the base layer (or the fabrication layer) with a gap gauge. In the case of this measuring method, it is possible to measure the thickness at four points located 20 mm inside the four corners of the fabrication stage, and calculate an average as the average thickness.

Figure 8A:
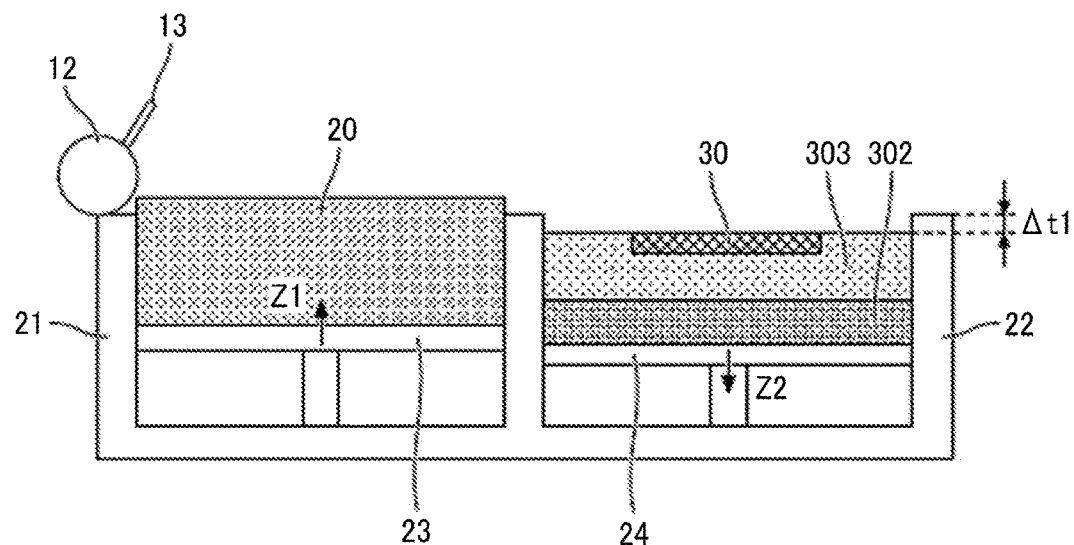
FIG. 8A is a schematic cross-sectional view of the forming unit, illustrating a step in a lamination fabricating method according to an embodiment of the present disclosure.

FIG. 8A illustrates a state where the base layer 302, the powder layer 303, and the fabrication layer 30 being a first layer are formed on the fabrication stage 24 of the fabrication chamber 22.

First, as illustrated in FIG. 8A, the supply stage 23 of the supply chamber 21 is elevated in the Z1 direction, and the fabrication stage 24 of the fabrication chamber 22 is lowered in a Z2 direction. At this time, a lowering distance of the fabrication stage 24 is set so that a distance between a top surface of the fabrication layer 30 and a bottom portion of the flattening roller 12 (bottom tangential portion) is $\Delta t1$. The distance $\Delta t1$ corresponds to a thickness of a powder layer to be subsequently formed. The distance $\Delta t1$ is preferably about 30 μm to about 100 μm.

Figure 8B:
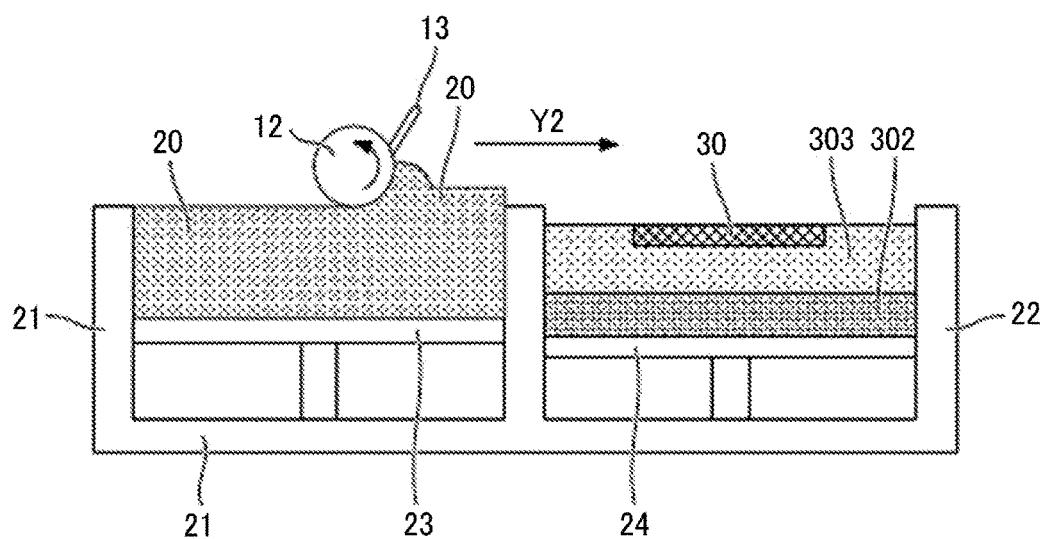
FIG. 8B is a schematic cross-sectional view of the forming unit, illustrating a step in a lamination fabricating method according to an embodiment of the present disclosure.
Figure 8C:
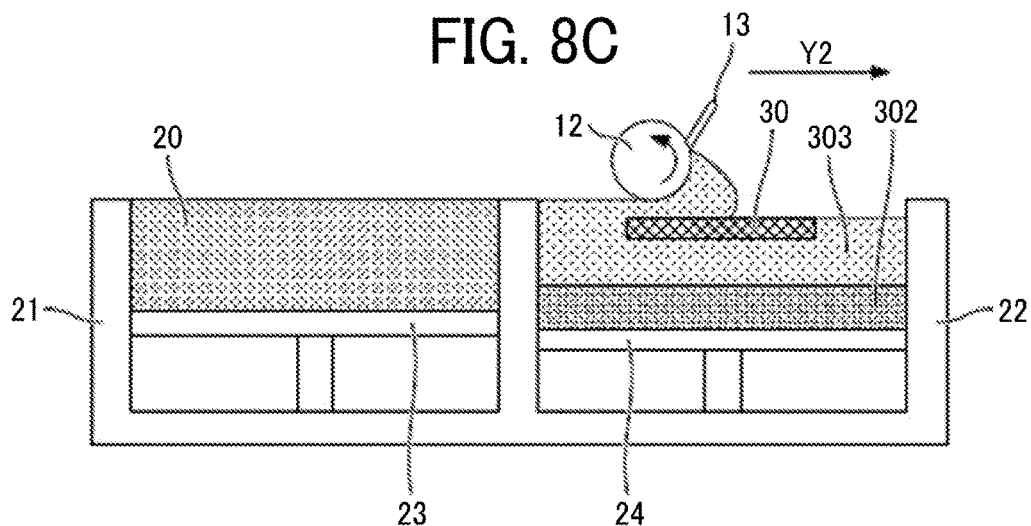
FIG. 8C is a schematic cross-sectional view of the forming unit, illustrating a step in the lamination fabricating method.

Next, as the powder layer forming step, a powder layer 31 is formed. As illustrated in FIGS. 8B and 8C, the powder 20 located above a top surface level of the supply chamber 21 is moved in the Y2 direction (to the fabrication chamber 22 side) while the flattening roller 12 is rotated in a forward direction (arrow direction) to transfer and supply the powder 20 to the fabrication chamber 22.

Figure 8D:
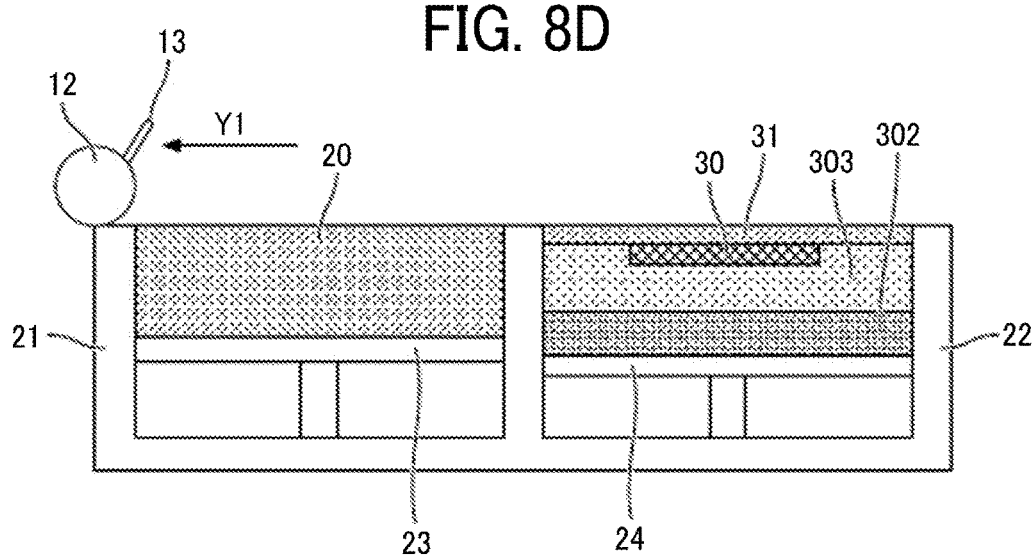
FIG. 8D is a schematic cross-sectional view of the forming unit, illustrating a step in the lamination fabricating method.

As illustrated in FIG. 8D, the flattening roller 12 is moved in parallel to a stage surface of the fabrication stage 24 of the fabrication chamber 22, and the powder layer 31 having the predetermined thickness of $\Delta t1$ is formed on the fabrication layer 30 of the fabrication stage 24 (flattening). After the powder layer 31 is formed, the flattening roller 12 moves in the Y1 direction and returns to the initial position. Here, the flattening roller 12 is designed to allow for movement while maintaining a constant distance from the top surface level of the fabrication chamber 22 and the supply chamber 21. When the flattening roller 12 moves while maintaining a constant distance from the fabrication chamber 22, it is possible to form the powder layer 31 having the thickness of $\Delta t1$ on the fabrication chamber 22 or the already formed fabrication layer 30 while conveying the powder 20 onto the fabrication chamber 22 by the flattening roller 12.

Figure 8E:
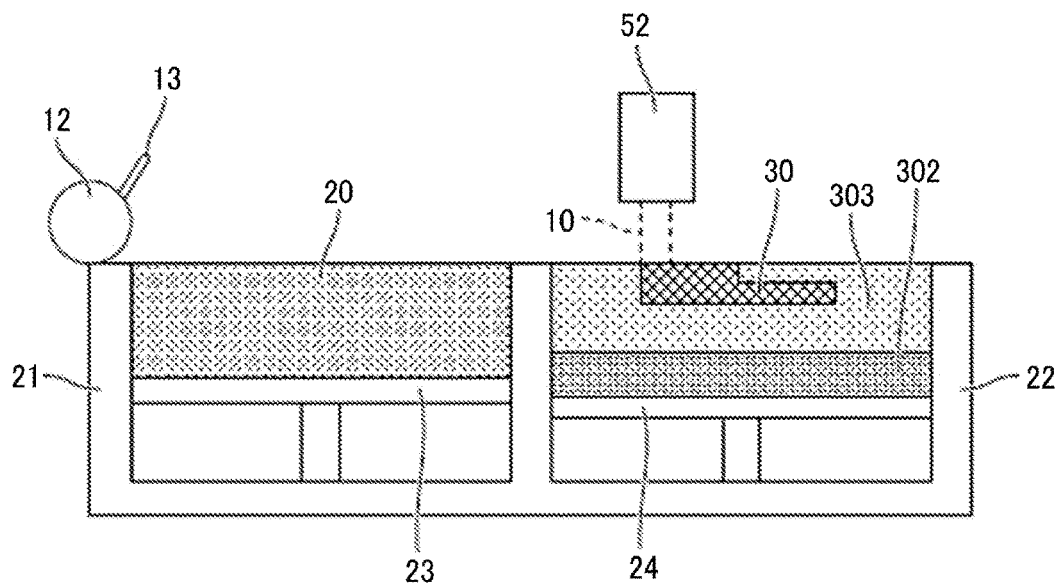
FIG. 8E is a schematic cross-sectional view of the forming unit, illustrating a step in the lamination fabricating method.

After that, as the application step, a fabrication liquid 10 is applied to the powder layer 31. As illustrated in FIG. 8E, droplets of the fabrication liquid 10 are discharged from the head 52 of the liquid discharge unit 50 to fabricate the fabrication layer 30. When the fabrication liquid 10 discharged from the head 52 is mixed with the powder 20, for example, an adhesive included in the powder 20 is dissolved, and dissolved adhesive parts adhere to one another to bond the powder 20 to form the fabrication layer 30.

Next, the powder layer forming step of forming the powder layer 31 by supplying and flattening the powder and the application step of applying the fabrication liquid 10 by the head 52 are repeated to form the new fabrication layer 30. At this time, the newly-formed fabrication layer 30 and the fabrication layer 30 therebeneath are united to form a part of a three-dimensional shaped fabricated object. Subsequently, the powder layer forming step of forming the powder layer 31 by supplying and flattening the powder and the application step of applying the fabrication liquid 10 by the head 52 are repeated for the number of times to be employed to complete the three-dimensional shaped fabricated object (three-dimensional fabricated object).

The purpose of the lamination fabricating method according to embodiments of the present disclosure is not particularly limited and can also be applied to a powder bed fusion bonding method.

Further, the fabricating method according to an embodiment of the present disclosure is not limited to a binder jetting (BJ) method and can be applied to other fabrication methods such as a material jetting (MJ) method and a high speed sintering (HSS) method.

EXAMPLES

Examples and comparative examples of the present disclosure will be described below, but the present disclosure is in no way limited to such examples and comparative examples. In the following description, "parts" represents "parts by mass" unless otherwise specified.

Example 1 <Production of Fabricated Object>

The lamination fabricating apparatus illustrated in FIG. 1 was used to produce a fabricated object in the steps described below. The areas of the fabrication chamber (fabrication stage) and the supply chamber (supply stage) in the lamination fabricating apparatus are the same.

First, under the following base layer production conditions (initial filling), a powder for three-dimensional fabrication was filled into the fabrication chamber up to overflow, and under the following base layer production conditions (spreading), the powder for three-dimensional fabrication was spread in the fabrication chamber ten times. After a base layer was formed, ten powder layers were formed on the base layer under the following lamination conditions, and then, the powder layer forming step and the application step were repeated to form a fabricated object having an average thickness of 5 mm.

As the fabricated object, a fabricated object having a square shape of 10×10×5 mm was formed in a central portion of the fabrication chamber by using an ink obtained by dissolving polyvinyl acetate as a binder resin. The fabricated object was retrieved and solidified by vacuum drying at 140° C. for 4 hours, and an average thickness of the resulting fabricated object was measured. The results are presented in Table 1.

—Common Conditions—
  Material (powder for three-dimensional fabrication): A1070-30BB, manufactured by Toyo Aluminum Co., Ltd.
  Recoat roller diameter: Φ20
  Movement speed of recoat roller: 200 mm/s
  Rotation speed of recoat roller: 240 rpm (rotation direction that is the counter direction with respect to the powder surface for three-dimensional fabrication)
—Base Layer Production Conditions (Initial Filling)—
  Distance between recoat roller and fabrication stage: 0.8 mm
  Distance between recoat roller and powder surface on fabrication stage: 0.0 mm—Amount of height movement of fabrication stage: ±0 μm
  Amount of height movement of supply stage: +600 μm
—Base Layer Production Conditions (Spreading)—
  Amount of height movement of fabrication stage: ±0 μm
  Amount of height movement of supply stage: +300 μm
—Lamination Conditions—
  Amount of height movement of fabrication stage: −100 μm (layer thickness of 100 μm per layer)
  Amount of height movement of supply stage: +300 μm <Measurement of Average Thickness of Base Layer>

As an example of evaluating the fabrication quality, an average thickness of the base layer was measured. Before the base layer and the powder layer were formed, the gap between the base layer forming unit and the fabrication stage was measured by using a clearance gauge, specifically, the thickness was measured at four points located 20 mm inside the four corners of the fabrication stage to calculate an average value as the average thickness of the base layer. The results are presented in Table 1.

<Measurement of Average Thickness of Fabricated Object>

As an example of evaluating the fabrication quality, an average thickness of the fabricated object was measured. In the measurement of the average thickness of the fabricated object, a caliper (manufactured by Mitutoyo Co., Ltd.) was used to measure the thickness of the fabricated object at three points, that is, at a central portion and at both end portions of the fabricated object, to calculate an average value of these values as the average thickness of the fabricated object. The results are presented in Table 1.

<Measurement of Powder Filling Rate of Base Layer>

After the base layer was formed, all the powder for three-dimensional fabrication in the fabrication chamber was collected by using a brush, and then, the mass of the collected powder was measured. The powder filling rate of the base layer was calculated by the following equation. The results are presented in Table 1.

When the powder filling rate is measured, the layer is destroyed, which prevents subsequent fabrication of the fabricated object. Therefore, the powder filling rate was measured using the base layer obtained in a step similar to the base layer forming step of Example 1.

$$A=D/(B \times C)/E,$$

where the symbols used are defined as follows.
A: powder filling rate of base layer
B: area of fabrication stage
C: average distance between fabrication stage and base layer forming unit
D: mass of powder for three-dimensional fabrication in base layer on fabrication stage
E: density of material of powder for three-dimensional fabrication <Measurement of Powder Filling Rate of Powder Layer>

The powder layer forming step and the application step in Example 1 were repeated, and in the step of forming a fabricated object having an average thickness of 5 mm, the powder layer forming step was performed without performing the application step, to obtain the powder layer. The powder filling rate of the powder layer was calculated by the following equation. The results are presented in Table 1.

$$F=(I-D)/(B \times G \times H)/E,$$

where the symbols used are defined as follows.
B: area of fabrication stage
D: mass of powder for three-dimensional fabrication in base layer on fabrication stage
E: density of material of powder for three-dimensional fabrication
F: powder filling rate of powder layer
G: average thickness of one layer in powder layer
H: number of layers
I: total mass of powder for three-dimensional fabrication in base layer and powder layer on fabrication stage Example 2

A process similar to Example 1 was performed to measure the average thickness and the powder filling rate, except that the distance between the recoat roller and the fabrication stage in the base layer production conditions (initial filling) of Example 1 was changed from 0.8 mm to 0.4 mm. The results are presented in Table 1.

Example 3

A process similar to Example 1 was performed to measure the average thickness and the powder filling rate, except that the distance between the recoat roller and the fabrication stage in the base layer production conditions (initial filling) of Example 1 was changed from 0.8 mm to 1.9 mm. The results are presented in Table 1.

Example 4

A process similar to Example 1 was performed to measure the average thickness and the powder filling rate, except that the base layer was not spread as in Example 1. The results are presented in Table 1.

Example 5

A process similar to Example 1 was performed to measure the average thickness and the powder filling rate, except that, after the base layer was formed, the powder layer between the base layer and the fabrication layer was not formed before forming the fabricated object as in Example 1. The results are presented in Table 1.

Example 6

A process similar to Example 1 was performed to measure the average thickness and the powder filling rate, except that the distance between the recoat roller and the fabrication stage in the base layer production conditions (initial filling) of Example 1 was changed from 0.8 mm to 2.5 mm. The results are presented in Table 1.

Comparative Example 1

A process similar to Example 1 was performed to measure the average thickness and the powder filling rate, except that the distance between the recoat roller and the fabrication stage in the base layer production conditions (initial filling) of Example 1 was changed from 0.8 mm to 8.0 mm. The results are presented in Table 1.

Aspect 3

The lamination fabricating method according to any one of the above-described aspects 1 and 2, in which the forming of the base layer includes spreading the powder for three-dimensional fabrication a plurality of times.

Aspect 4

The lamination fabricating method according to any one of the above-described aspects 1 to 3, in which the forming of the powder layer is performed after the forming of the base layer, and after the forming of the powder layer, the forming of the powder layer and the applying of the fabrication liquid are repeatedly performed to form the fabricated object.

According to the lamination fabricating method according to any one of the above-described aspects 1 to 4, conventional problems can be solved and the object of the present disclosure can be achieved. Any one of the above-described operations may be performed in various other ways, for example, in an order different from the one described above.

TABLE 1

|  | Average thickness of base layer [mm] | Number of spreading operations [times] | Distance between recoat roller and fabrication stage [mm] | Number of powder layers on base layer [layers] | Average thickness of fabricated object [mm] | Powder filling rate of base layer [%] | Powder filling rate of powder layer [%] |
|---|---|---|---|---|---|---|---|
| Example 1 | 0.8 | 10 | 0.8 | 10 | 5.02 | 60.0 | 56.1 |
| Example 2 | 0.4 | 10 | 0.4 | 10 | 5.04 | 61.5 | 56.0 |
| Example 3 | 1.9 | 10 | 1.9 | 10 | 5.05 | 56.3 | 56.1 |
| Example 4 | 0.8 | 0 | 0.8 | 10 | 5.06 | 59.2 | 56.1 |
| Example 5 | 0.8 | 10 | 0.8 | 0 | 5.11 | 59.9 | 56.0 |
| Example 6 | 2.5 | 10 | 2.5 | 10 | 5.06 | 56.0 | 55.8 |
| Comparative Example 1 | 8 | 10 | 8 | 10 | 5.25 | 50.7 | 56.1 |

As presented in Table 1, in all of the fabricated objects obtained in Examples 1 to 6, an increase in the average thickness of the fabricated object was suppressed, while in the fabricated object obtained in Comparative Example 1, the average thickness of the fabricated object is increased, and accordingly, the quality of the fabricated object is lowered.

For example, aspects of the present disclosure include the following.

Aspect 1

A lamination fabricating method of forming a fabricated object by repeatedly performing: forming a powder layer including a powder for three-dimensional fabrication; and applying a fabrication liquid to the powder layer, wherein the lamination fabricating method includes forming a base layer prior to the forming of the powder layer, a powder filling rate of the base layer being higher than a powder filling rate of the powder layer.

Aspect 2

The lamination fabricating method according to the above-described aspect 1, in which the base layer has an average thickness of 2.0 mm or less.

The invention claimed is:
1. A lamination fabricating method, comprising:
forming a powder layer including a powder for three-dimensional fabrication;
applying a fabrication liquid to the powder layer;
repeating the forming of the powder layer and the applying of the fabrication liquid to form a fabricated object; and
forming a base layer including the powder on a fabrication stage prior to the forming of the powder layer, wherein
the forming of the base layer is repeatedly performed without changing a height of the fabrication stage, and
a powder filling rate of the base layer is higher than a powder filling rate of the powder layer.
2. The lamination fabricating method according to claim 1, wherein the base layer has an average thickness of 2.0 mm or less.
3. The lamination fabricating method according to claim 1,
wherein after the forming of the base layer, only the forming of the powder layer is performed, and
then the repeating of the forming of the powder layer and the applying of the fabrication liquid is performed to form the fabricated object.
4. The lamination fabricating method according to claim 1,
wherein the powder filling rate of the base layer is 50% or more and 85% or less.

5. The lamination fabricating method according to claim 1, wherein the powder filling rate of the powder layer is 50% or more and 85% or less.

* * * * *